(12) United States Patent
Takata et al.

(10) Patent No.: US 7,882,112 B2
(45) Date of Patent: Feb. 1, 2011

(54) IMAGE SEARCH DEVICE AND IMAGE SEARCH METHOD

(75) Inventors: Kazutoyo Takata, Osaka (JP); Satoshi Matsuura, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/745,710

(22) PCT Filed: Jul. 24, 2009

(86) PCT No.: PCT/JP2009/003490

§ 371 (c)(1),
(2), (4) Date: Jun. 2, 2010

(87) PCT Pub. No.: WO2010/013424

PCT Pub. Date: Feb. 4, 2010

(65) Prior Publication Data

US 2010/0250601 A1    Sep. 30, 2010

(30) Foreign Application Priority Data

Jul. 29, 2008    (JP) .............................. 2008-195413

(51) Int. Cl.
*G06F 17/30* (2006.01)
(52) U.S. Cl. ........................ 707/749; 707/706; 707/732; 707/737; 707/751; 707/769; 382/106; 382/209
(58) Field of Classification Search ................. None
See application file for complete search history.

(56) References Cited

U.S. PATENT DOCUMENTS 6,792,417 B1   9/2004   Mochizuki
6,813,618 B1   11/2004  Loui et al.

(Continued)

FOREIGN PATENT DOCUMENTS

JP    5-089176    4/1993

(Continued)

OTHER PUBLICATIONS

International Search Report issued Sep. 1, 2009 in International (PCT) Application No. PCT/JP2009/003490.

*Primary Examiner*—Apu M Mofiz
*Assistant Examiner*—Hung D Le
(74) *Attorney, Agent, or Firm*—Wenderoth, Lind & Ponack, L.L.P.

(57) ABSTRACT

An image search device is provided which relatively easily outputs images that a user wishes to use for interpolation from among a large volume of stored image content data.

The image search device includes: a degree-of-association database (102) which stores degrees of association between images; an input unit (103) which receives a first image and a second image; an interpolation range computing unit (104) which computes interpolation range including first photographing location of the first image and second photographing location of the second image; an imaging content inferring unit (107) which infers imaging content of interpolation images based on the degree of association between the first image and an image belonging to the interpolation range and the degree of association between the second image and the image belonging to the interpolation range; an interpolation image obtaining unit (108) which obtains interpolation images from among candidate images using the inferred imaging content; and an output unit (109) which outputs the interpolation images.

15 Claims, 29 Drawing Sheets

U.S. PATENT DOCUMENTS

| | | |
|---|---|---|
| 7,715,586 B2 * | 5/2010 | Issa et al. .................... 382/100 |
| 7,746,512 B2 * | 6/2010 | Yamakado et al. .......... 358/474 |
| 2005/0010602 A1 | 1/2005 | Loui et al. |
| 2005/0182649 A1 * | 8/2005 | Parulski ........................ 705/1 |
| 2006/0080286 A1 * | 4/2006 | Svendsen ...................... 707/3 |
| 2008/0080762 A1 | 4/2008 | Kawakami |

FOREIGN PATENT DOCUMENTS

| | | |
|---|---|---|
| JP | 2000-099531 | 4/2000 |
| JP | 2002-163264 | 6/2002 |
| JP | 2006-074612 | 3/2006 |
| JP | 2006-178721 | 7/2006 |
| JP | 2007-034595 | 2/2007 |
| JP | 2007-213216 | 8/2007 |
| JP | 2007-323315 | 12/2007 |
| JP | 2008-090601 | 4/2008 |

* cited by examiner

FIG. 3

| User ID | Image ID | Image address | Photographing time and date | Photographing location | Tag |
|---|---|---|---|---|---|
| User001 | u1_1 | ···u1_1.jpg | May 20, 2006 17:00:00 | (34.3,132.3) | Hiroshima, Itsukushima shrine |
| | u1_2 | ···u1_2.jpg | March 10, 2008 10:50:00 | (35.1,135.8) | Kyoto, Kiyomizu temple, Niomon gate |
| | u1_3 | ···u1_3.jpg | March 10, 2008 11:00:00 | (35.0,135.8) | Kyoto, Kiyomizu temple, Stage |
| | u1_4 | ···u1_4.jpg | March 10, 2008 14:00:00 | (35.0,135.8) | Kyoto, Ginkaku temple, Garden, Zen garden |
| User002 | u2_1 | ···u2_1.jpg | August 26, 2004 12:00:00 | (35.0,135.8) | Kyoto, Kiyomizu temple, Dumpling |
| ⋮ | | | | | ⋮ |

| | Kyoto | Kiyomizu temple | Stage | Ginkaku temple | Garden | ... |
|---|---|---|---|---|---|---|
| Kyoto | - | 0.7 | 0.9 | 0.7 | 0.4 | ... |
| Kiyomizu temple | - | - | - | 0.3 | 0.1 | ... |
| Stage | - | - | - | 0.1 | 0.2 | ... |
| Ginkaku temple | - | - | - | - | 0.8 | ... |
| Garden | - | - | - | - | - | ... |
| ... | ... | ... | ... | ... | ... | ... |

102

FIG. 6
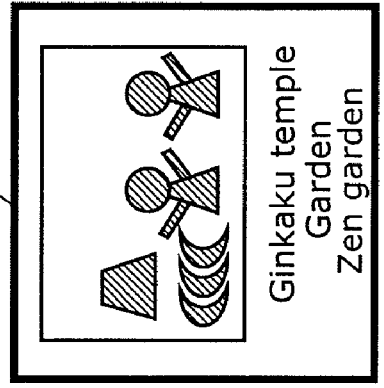
Photos of Kyoto
Garden museum
Rock garden
60 — Kiyomizu temple
Stage
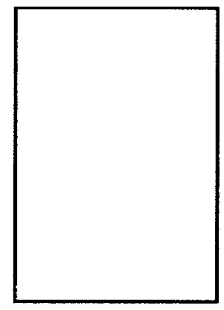
Kinkaku temple
Garden
Strolling style
Daitoku temple
Rock garden
Moss
61 — Ginkaku temple
Garden
Zen garden
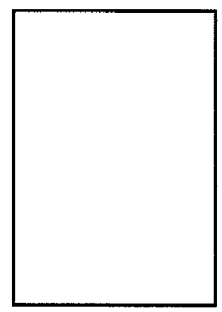
Kyoto station
Bullet train

FIG. 21

|  | Eat | Enter-tainment | See | Stay |
|---|---|---|---|---|
| 9:00-11:00 | 0.1 | 0.1 | 0.8 | 0.0 |
| 11:00-13:00 | 0.6 | 0.1 | 0.3 | 0.0 |
| 13:00-15:00 | 0.2 | 0.1 | 0.7 | 0.0 |

Area 1

1001

Photographing time:9:30

See
Garden museum
Rock garden

IMAGE SEARCH DEVICE AND IMAGE SEARCH METHOD

TECHNICAL FIELD

The present invention relates to an image search device which outputs, from among a large volume of stored image content data, image content data used for interpolation between photographing locations of image content data taken by a user, and to a search method thereof.

BACKGROUND ART

When travelling, the user is sometimes busy taking photographs and cannot enjoy the travelling itself. Meanwhile, when visiting tourist sites, many travelers tend to photograph similar landscapes of similar places. In fact, in photo sharing services provided on the Internet, photos with similar composition as the photos taken by the user are often found. Thus, if photo albums that are memories of travel can be created easily by interpolating photos found in the photo sharing services with respect to the photos taken by the user, the user can record the memories of travel without photographing everything while traveling.

When the user creates a travel photo album using the photo sharing service, the user needs to enter keywords in order to search photos used for interpolation. A characteristic of image content data is that unlike moving image content data or music content data, there is such an enormous amount of content data that viewing the list all at once is impossible. For example, in some of the representative photo sharing services, if the user enters only the keyword "Okinawa" for searching, more than one hundred thousand photos are found as search results. In order to select only the photos that the user wants to record as memories from among such a large number of photos, the user must narrow down the number of photos till the user can view their list on a monitor or the like. More specifically, the user needs to enter several keywords combined to narrow down the number of photos. Performing such entering, selecting and the like for each travel experience imposes significant operation burdens on the user.

For such a problem, there is a proposed method which allows the user to easily create the travel photo album using photos of tourist sites that are stored in a server in advance (For example, see Patent Literature 1). In the method disclosed in Patent Literature 1, using tag readers provided at respective photo spots at tourist sites, the user reads out high-quality photos of the spots that are pre-stored in the server. As a result, the user can easily create the travel photo album without taking photos of everything by himself or herself.

[Citation List]

[Patent Literature]

[PTL 1]

Japanese Unexamined Patent Application Publication No. 2007-213216

SUMMARY OF INVENTION

Technical Problem

However, even when photos are taken at the same spot, the imaging content of the photos are often different to each other depending on photographers. Thus, the method disclosed in Patent Literature 1 has a problem in that the album results in including the photos with the imaging content that the user does not wish to record. For example, when the user takes photos from the same spot at Kiyomizu temple in Kyoto, the photo focusing the temple in foreground and the photo focusing the mountain in background have different imaging content. Further, the imaging content also differ depending on the direction toward which the user takes photo (photographing direction) such as toward the road in the opposite direction of the temple or sky in upward direction. Moreover, the imaging content significantly differ depending on not only the photographing direction, but also differences such as photographing time of day or photographing time of year. When the photos having such different imaging content are added to the album at once, the album results in including a large number of photos with the imaging content different from the user's desired imaging content. As a result, the user needs to delete those added photos, thereby increasing the operation burden of the user.

The present invention is to solve such problems, and provides an image search device which is capable of outputting the images that the user wishes to use for interpolation relatively easily from among a large volume of stored image content data, and a search method thereof.

Solution to Problem

In order to solve the problems, the image search device according to an aspect of the present invention outputs an image searched for from among a plurality of images. The image search device includes: a degree-of-association database which stores a degree of association indicating a degree of association between images; an input unit which receives a first image including first information and a second image including second information; an interpolation range computing unit which computes, as an interpolation range, a range of an area including a first photographing location of the first image and a second photographing location of the second image, the first photographing location being obtained from the first information, the second photographing location being obtained from the second information; an imaging content inferring unit which infers imaging content of an interpolation image to be used for an interpolation between the first photographing location and the second photographing location, based on (i) the degree of association between the first image and an image which is among the plurality of images and belongs to the interpolation range computed by the interpolation range computing unit, and (ii) the degree of association between the second image and the image which is among the plurality of images and belongs to the interpolation range computed by the interpolation range computing unit, the degrees of association being stored in the degree-of-association database; an interpolation image obtaining unit which obtains the interpolation image from among the plurality of images, using the imaging content inferred by the imaging content inferring unit; and an output unit which outputs the interpolation image obtained by the interpolation image obtaining unit.

With this, it is possible to obtain an image whose photographing location approximates those of the input images and which has high degree of association with the imaging content of the input images. This allows relatively easy output of the images used for interpolation between the photographing locations of the input images. For example, the user can relatively easily interpolate the images of the events that the user experienced between the images taken by the user, using the images taken by other people.

Furthermore, the user can interpolate the images without using dedicated infrastructure, such as tag readers.

ADVANTAGEOUS EFFECTS OF INVENTION

According to the present invention, it is possible to relatively easily output the images that the user wishes to use for interpolation from among a large volume of stored image content data.

BRIEF DESCRIPTION OF DRAWINGS

FIG. 3 is a diagram showing an example of an image database.

FIG. 4 is a diagram showing an example of a degree-of-association database.

FIG. 6 is a diagram showing an example of a screen of an input unit.

FIG. 21 is a diagram showing relationship between the degree-of-association database and a photographed image.

DESCRIPTION OF EMBODIMENTS

Hereinafter, an image search device according to the present invention will be described in detail with reference to the drawings. It is to be noted that for simplicity of explanation, the following embodiments use an example case where a travel photo album is created by interpolating images stored in a database with respect to the images photographed by a user during the user's trip to Kyoto.

Embodiment 1

Figure 1:
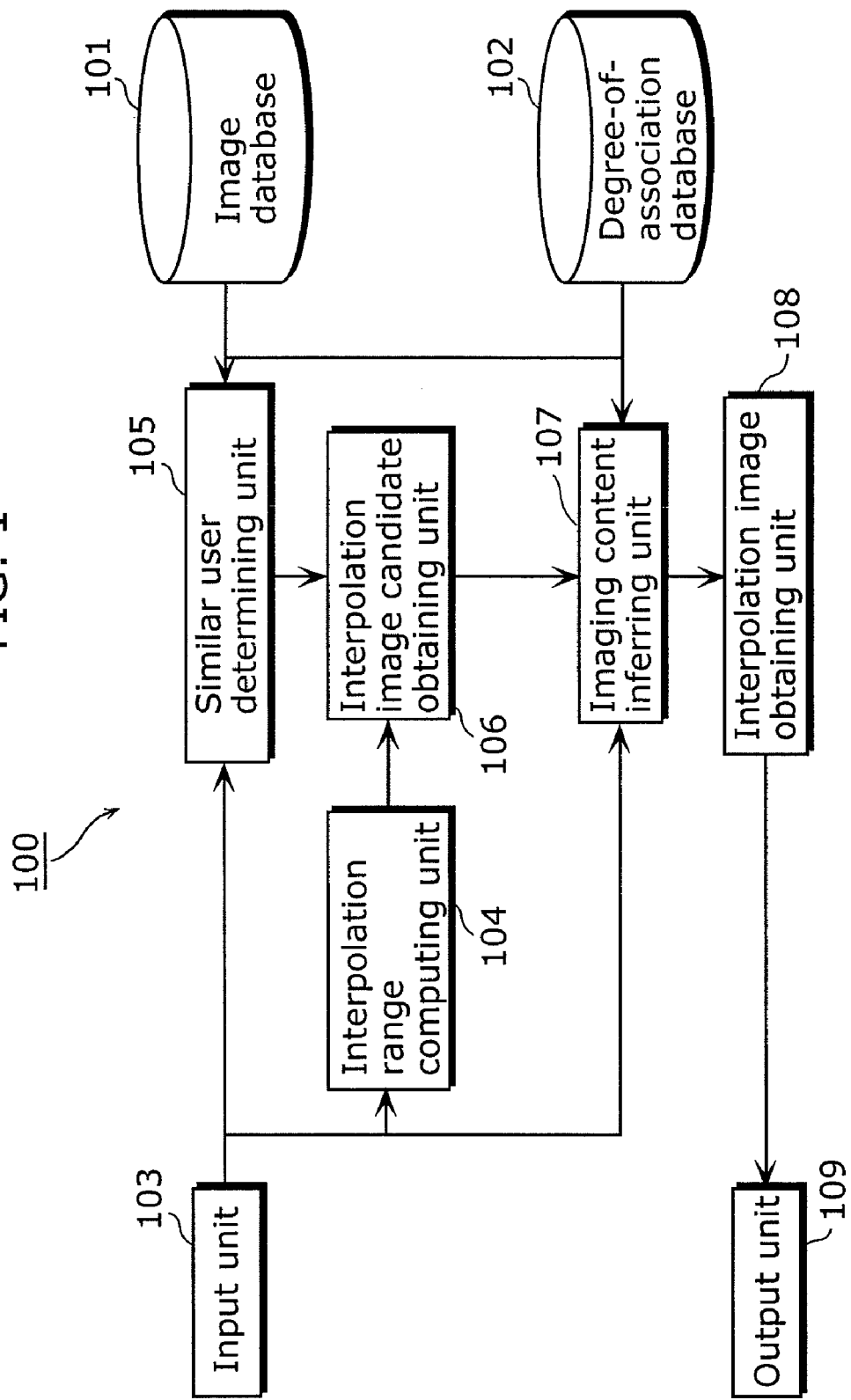
FIG. 1 is a block diagram showing a characteristic functional structure of an image search device according to Embodiment 1 of the present invention.

FIG. 1 is a block diagram showing a characteristic functional structure of an image search device 100 according to Embodiment 1 of the present invention. As shown in FIG. 1, the image search device 100 is a device which outputs an image searched for from among a plurality of images. The image search device 100 includes: an image database 101, a degree-of-association database 102; an input unit 103; an interpolation range computing unit 104; a similar user determining unit 105; an interpolation image candidate obtaining unit 106; an imaging content inferring unit 107; an interpolation image obtaining unit 108; and an output unit 109.

Hereinafter, details of each element of the image search device 100 shown in FIG. 1 are described in order.

The image database 101 is a database which stores image content data 20 that are targets for search and content associated information 21 which correspond to the respective image content data 20. Here, the image content data 20 refers to an image stored in an electronic medium. Further, the content associated information 21 is information indicating the details of the image content data 20. To be more specific, the content associated information 21 is, for example, Exchangeable image file format (Exif) information (such as photographing time and date, latitude and longitude information) that is added to the image content data 20 when the photo is taken, and image information such as a tag that is added by the user to the image content data 20 after the photo was taken.

Figure 2:
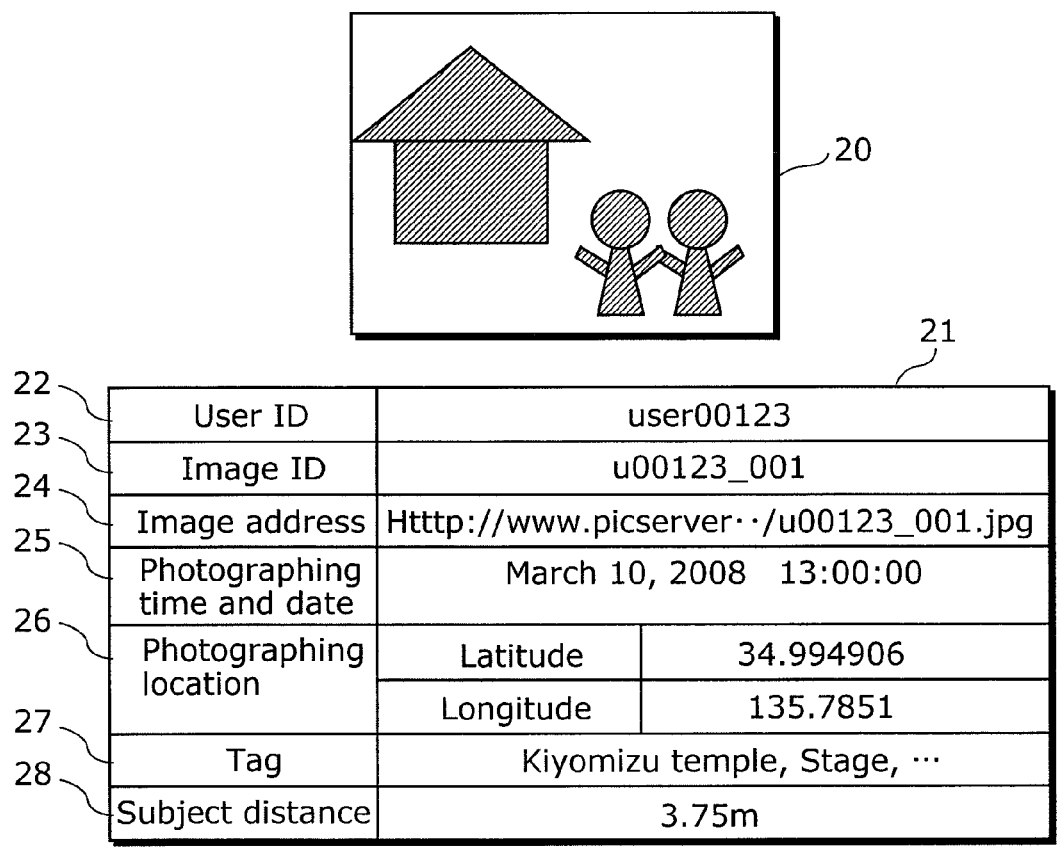
FIG. 2 is a diagram showing an example of image content data and content associated information.

FIG. 2 is a diagram showing an example of the image content data 20 and the content associated information 21 stored in the image database 101. As shown in FIG. 2, the image database 101 stores, in addition to the image content data 20, the content associated information 21 including a user ID 22, an image ID 23, an image address 24, a photographing time and date 25, a photographing location 26, a tag 27, and a subject distance 28.

The user ID 22 indicates information for identifying the user who took the photograph of the image content data 20. The image ID 23 indicates information for identifying the image content data 20. The image address 24 indicates where the image content data 20 is stored. The photographing time and date 25 indicates the time and date when the image content data 20 was taken. The photographing location 26 indicates the location where the image content data 20 was taken. The location where the image content data 20 was taken is specified by latitude and longitude. The subject distance 28 indicates the distance from the camera to the subject when the image content data 20 was taken.

The tag 27 indicates words (keywords) representing the content of the image content data 20. For example, the user manually inputs those words to the tag 27 after the image was taken. Further, the image search device 100 may automatically add, as the tag 27, the name of the area or building obtained based on information of latitude and longitude included in the photographing location 26. The image search device 100 may also automatically add, as the tag 27, information of weather and temperature using the photographing time and date 25, the photographing location 26, and weather database. Further, the image search device 100 may also automatically add, as the tag 27, the representative color of the image obtained from pixel values of the image content data 20. Further, the image search device 100 may automatically add, as the tag 27, information of the number of people detected by human detection performed on the image content data 20.

FIG. 3 is a diagram showing an example of the image database 101. As shown in FIG. 3, the image database 101 includes lists of content associated information shown in FIG. 2 for facilitating search.

It is to be noted that in the present embodiment, a case where the image database 101 is included in the image search device 100, but the image search device to which the present invention is applied is not limited to such an image search device. For example, the image database 101 may be provided on a server connected to the image search device via a network.

Further, the content associated information 21 may be included in the image content data 20.

Now, descriptions of each element of the image search device 100 shown in FIG. 1 is continued.

The degree-of-association database 102 stores degree of association between the image content data 20. More specifically, the degree-of-association database 102 stores degree of association between subject information of the image content data 20. Here, the subject information refers to information of words representing the subject of the image content data 20 taken by the user. Specific examples of the subject information include the name of the subject, the name of the area where the subject is located, the number of subjects, the color of the subject that are set to the tag 27.

Further, the degree-of-association database 102 stores the degree of association of the subject information on an area basis. To be more specific, the degree-of-association database 102 stores, for each area, the degree of association between the tags 27 of the image content data 20 belonging to each area. Here, the areas refer to places each divided based on prefecture, city, 50 km square or the like.

Further, the degree of association is computed, for example, using a method disclosed in "A Construction Method of a Metadata Space for an associative search utilizing the relation of each word in documents" (Hidenori HOMMA et al, $16^{th}$ data engineering workshop (DEWS2005), 6A-02, The institute of electronics, information and communication engineers, 2005) (Non-Patent Literature 1).

FIG. 4 is a diagram showing an example of the degree-of-association database 102 for Higashiyama-ward and Sakyo-ward areas which are both in Kyoto city. The degree-of-association database 102 shown in FIG. 4 stores degree of association between the tags 27 in the row direction and the tags 27 in the column direction at respective points where the row and the column intersect one another. These degree of association are computed based on co-occurrence of the tags 27 of the image content data 20 belonging to each area.

Here, the area to which the image content data 20 belongs is determined based on the photographing location 26 of the image content data 20.

The areas in the degree-of-association database 102 may be hierarchically grouped into multiple layers. For example, the degree-of-association database 102 may store degree of association between the tags 27 using three level areas that are small area, middle area, and large area.

Figure 5:
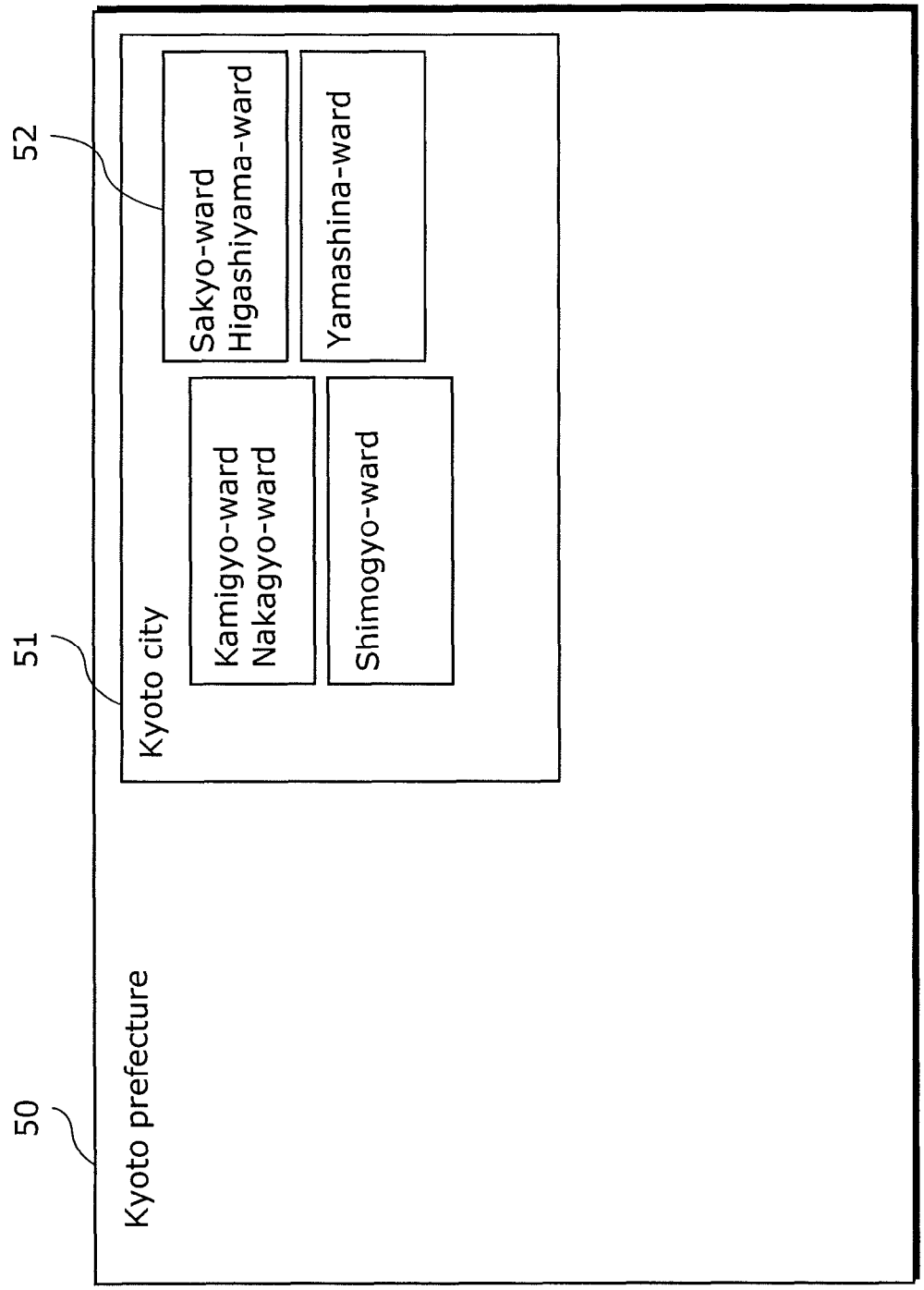
FIG. 5 is a conceptual diagram showing hierarchically grouped areas.

FIG. 5 is a conceptual diagram showing the hierarchically grouped areas. As shown in FIG. 5, the degree-of-association database 102 may store degree of association between the tags 27 of the image content data 20 belonging to Kyoto prefecture as the degree of association corresponding to the large area 50 indicating the area in a prefectural unit. Further, the degree-of-association database 102 may store degree of association between the tags 27 of the image content data 20 belonging to Kyoto city as the degree of association corresponding to the middle area 51 indicating the area in a city unit. Further, the degree-of-association database 102 may store degree of association between the tags 27 of the image content data 20 belonging to Shimogyo-ward as the degree of association corresponding to the small area 52 indicating the area in a ward unit. Accordingly, by storing the degree of association for each hierarchically grouped area in the association degree database 102, the imaging content inferring unit 107, which will be described later, can select the area for which the association degree is obtained in the degree-of-association database 102 according to the user's desired interpolation area. As a result, the imaging content inferring unit 107 can accurately infer the imaging content of the image that the user wishes to interpolate.

The input unit 103 receives the image content data 20 taken by the user and their image IDs 23 as well as interpolation target images, among the image content data 20, of which the user wishes to interpolate between the photographing locations, and information on those interpolation target images (for example, image IDs 23). Then, the input unit 103 notifies the interpolation range computing unit 104 and the similar user determining unit 105 of the image IDs 23 of the received interpolation target images.

FIG. 6 is a diagram showing an example of a screen of the input unit 103. As shown in FIG. 6, the user selects a plurality of image content data 20 (interpolation target images) of which the user wishes to interpolate between the photographing locations, from among the image content data 20 that the user took by himself or herself. In this example here, the user selects, from among six items of image content data 20 photographed in Kyoto, the interpolation target image (Kiyomizu temple) 60 and the interpolation target image (Ginkaku temple) 61. In other words, the input unit 103 receives, from the user, a request to interpolate images of places between Kiyomizu temple and Ginkaku temple.

The interpolation range computing unit 104 refers to the image database 101 to obtain the photographing locations 26 and the photographing time and date 25 of the image IDs 23 provided to the input unit 103. Then, the interpolation range computing unit 104 computes, using the obtained photographing locations 26 and photographing time and date 25, the interpolation range 72 indicating the range of the target area of interpolation. More specifically, the interpolation range computing unit 104 computes the range of the area including the photographing locations 26 of the interpolation target images, as the interpolation range. Subsequently, the interpolation range computing unit 104 computes the interpolation range such that the greater the elapsed time is between the photographing time and date 25 of the interpolation target images, the larger the range of the target area of interpolation becomes. Further, the interpolation range computing unit 104 notifies the interpolation image candidate obtaining unit 106 of the computed interpolation range 72. Specific method of computing of the interpolation range will be described later.

Figure 7:
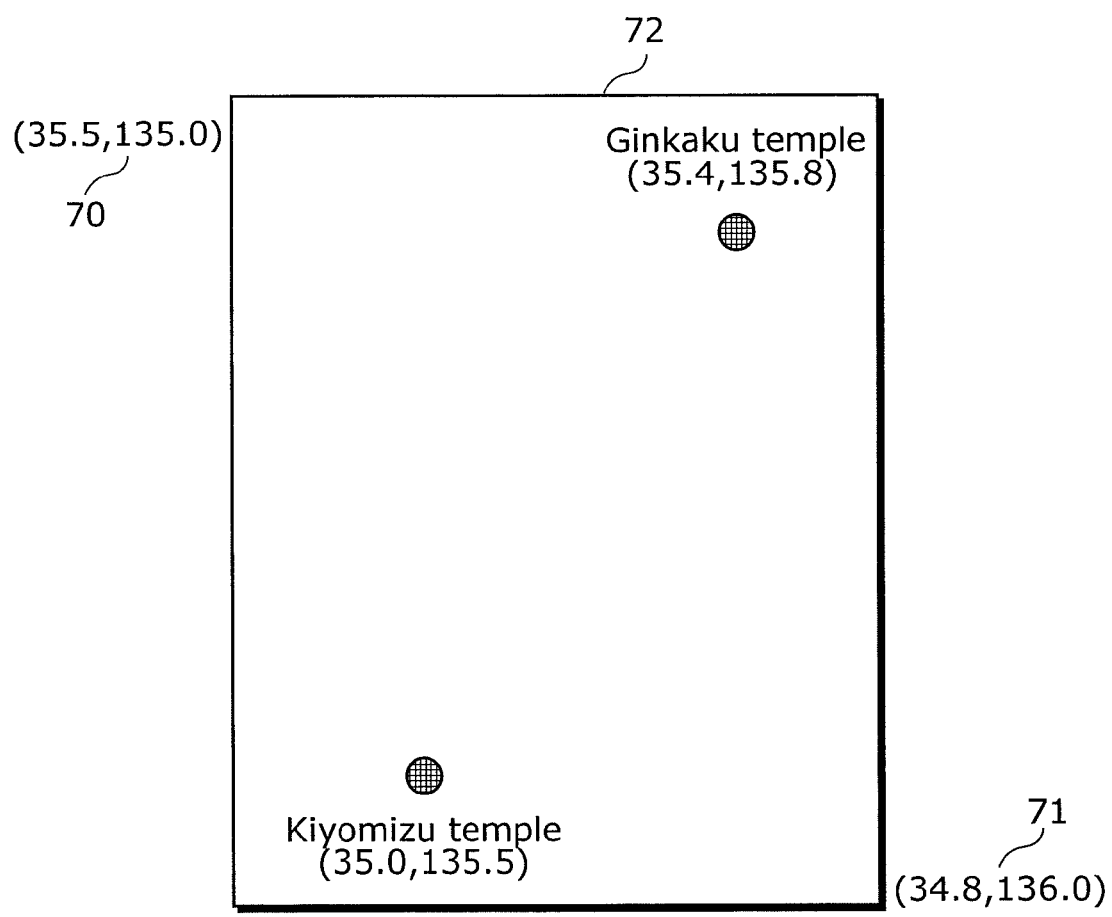
FIG. 7 is a diagram showing an example of an interpolation range.

FIG. 7 is a diagram showing an example of the interpolation range 72 computed based on the interpolation target image (Kiyomizu temple) 60 and the interpolation target image (Ginkaku temple) 61. As shown in FIG. 7, in the case where the interpolation range 72 is obtained in a rectangle, the interpolation range computing unit 104 computes the latitude and the longitude of diagonal points of the rectangle as range information 70 and range information 71.

The similar user determining unit 105 is an example of a similar image group detecting unit, and detects a group of similar images including images which are similar to the interpolation target images. To be more specific, the similar user determining unit 105 refers to the image database 101 to detect a group of images similar to the image content data 20 indicated by the image IDs 23 received from the input unit 103. In particular, the similar user determining unit 105 determines whether or not other users registered in the image database 101 are users (similar users) who have a group of images that are similar to the interpolation target images. When determined as the similar users, the similar user determining unit 105 notifies the interpolation image candidate obtaining unit 106 of the user IDs 22. More specifically, the similar user determining unit 105 detects a group of images that are similar to the interpolation target images (similar image group) per user. Here, a group of images refers to a group of the image content data 20. Specific method of determination of similarity will be described later.

The interpolation image candidate obtaining unit 106 obtains, as candidate images, the image content data 20, of the similar users, belonging to the interpolation range 72 from the image database 101, using the interpolation range 72 computed by the interpolation range computing unit 104 and the user IDs 22 of the similar users obtained by the similar user determining unit 105. Then, the interpolation image candidate obtaining unit 106 notifies the imaging content inferring unit 107 of the image IDs 23 indicating the obtained candidate images. More specifically, the interpolation image candidate obtaining unit 106 obtains, from among the group of similar images, the candidate images belonging to the interpolation range 72 computed by the interpolation range computing unit 104. To be more specific, the interpolation image candidate obtaining unit 106 refers to the image database 101 to obtain the image content data 20, of the similar users, belonging to the interpolation range 72 as the candidate images. These candidate images are the image content data 20 whose photographing locations 26 (latitude and longitude) are within the interpolation range 72 and whose user IDs 22 match the user IDs 22 of the similar users.

Figure 8:
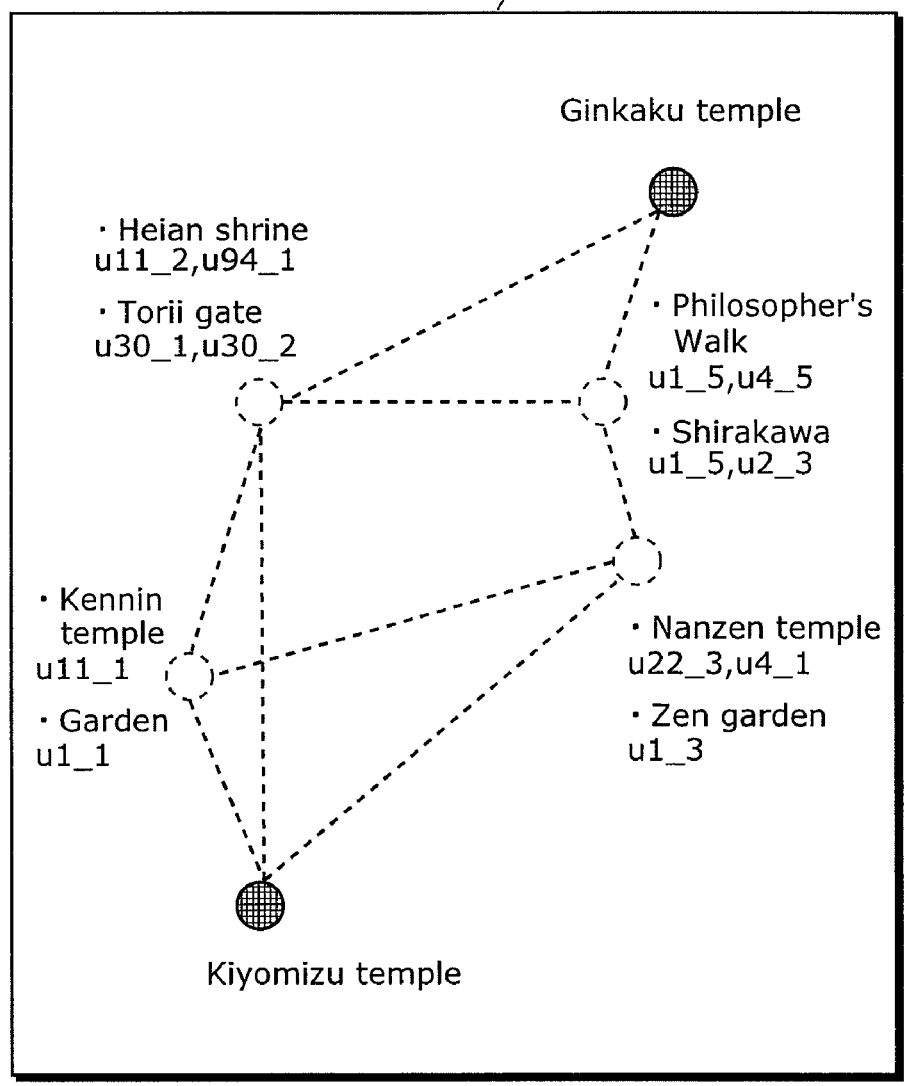
FIG. 8 is a diagram showing an example of candidate images.

FIG. 8 is a diagram showing an example of the candidate images obtained by the interpolation image candidate obtaining unit 106. As shown in FIG. 8, the interpolation image candidate obtaining unit 106 obtains the image content data 20 taken by one or more similar users from among the image content data 20 whose photographing locations belong to the interpolation range 72. In this case, each image content data 20 has several tags 27; and thus, even though the candidate images obtained by the interpolation image candidate obtaining unit 106 are the image content data 20 taken at the same location, all tags 27 do not always match.

The imaging content inferring unit 107 infers the imaging content of the interpolation images that are images used for interpolating between the photographing locations of the interpolation target images, based on the degree of association stored in the degree-of-association database 102 and between the interpolation target images and the candidate images obtained by the interpolation image candidate obtaining unit 106. More specifically, the imaging content inferring unit 107 refers to the degree-of-association database 102 to obtain the degree of association between subject information of the candidate images and subject information of the interpolation target images. Then, the imaging content inferring unit 107 infers, as the imaging content of the interpolation images, the subject information of the candidate images whose degree of association obtained are higher than predetermined threshold. Subsequently, the imaging content inferring unit 107 notifies the interpolation image obtaining unit 108 of the image IDs 23 of the candidate images and the inferred imaging content. Specific method of inferring of imaging content will be described later.

The interpolation image obtaining unit 108 obtains one ore more interpolation images from among the candidate images obtained by the interpolation image candidate obtaining unit 106, using the imaging content inferred by the imaging content inferring unit 107. More specifically, the interpolation image obtaining unit 108 obtains, as the interpolation images, the candidate images having imaging content which match the imaging content inferred by the image content inferring unit 107. To be more specific, the interpolation image obtaining unit 108 refers to the image database 101 to obtain the interpolation images. These interpolation images are the image content data 20 that have tags 27 which match the imaging content inferred by the imaging content inferring unit 107 among the image content data 20 identified by the image IDs 23 of the candidate images.

Note that the case where the imaging content match one another includes not only the case where the words representing the imaging content exactly match, but also the case where they substantially match. For example, the interpolation image obtaining unit 108 may refer to a thesaurus including words having substantially synonymous words. By doing so, the interpolation image obtaining unit 108 may obtain, as the interpolation image, the candidate image with the tag 27 including the word determined as synonymous with the imaging content inferred by the imaging content inferring unit 107.

Figure 9:
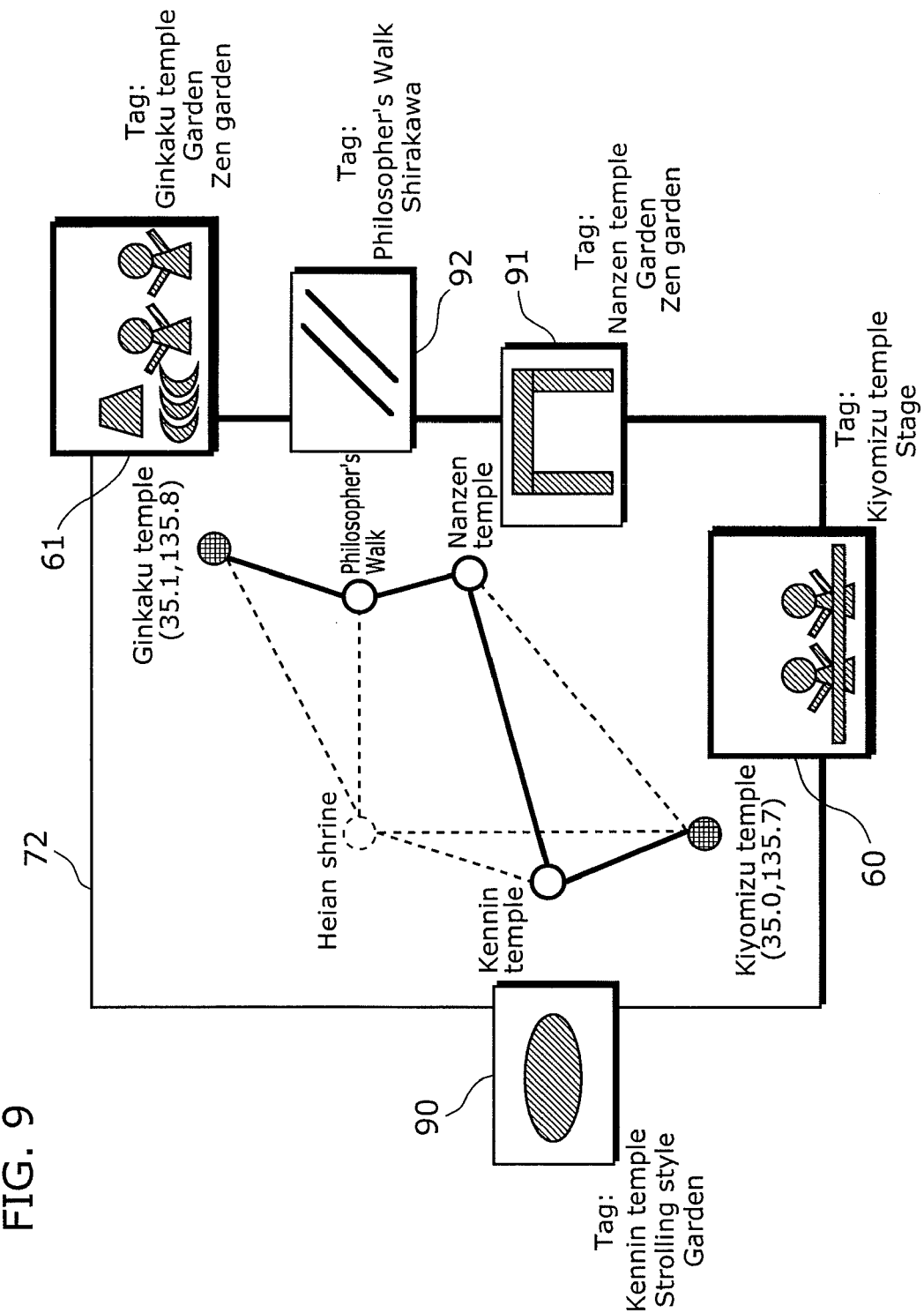
FIG. 9 is a diagram showing an example of interpolation images.

FIG. 9 is a diagram showing an example of interpolation images obtained by the interpolation image obtaining unit 108. In FIG. 9, "Garden", "Zen garden", and "Shirakawa" are inferred as the imaging content by the imaging content inferring unit 107. Further, the interpolation image obtaining unit 108 obtains the interpolation image (Garden) 90, the interpolation image (Zen garden) 91, and the interpolation image (Shirakawa) 92 each having the tag 27 indicating the inferred imaging content. In such a manner, the interpolation image obtaining unit 108 obtains the image content data 20 having high degree of association with the interpolation target images, as the interpolation images to be used for interpolation between the photographing locations of the interpolation target image (Kiyomizu temple) 60 and the interpolation target image (Ginkaku temple) 61.

The output unit 109 outputs the image content data 20 obtained by the interpolation image obtaining unit 108 to an output medium. Examples of the output medium include a monitor such as a liquid crystal display and TV.

Next, the operations of the image search device 100 configured as above will be described.

Figure 10:
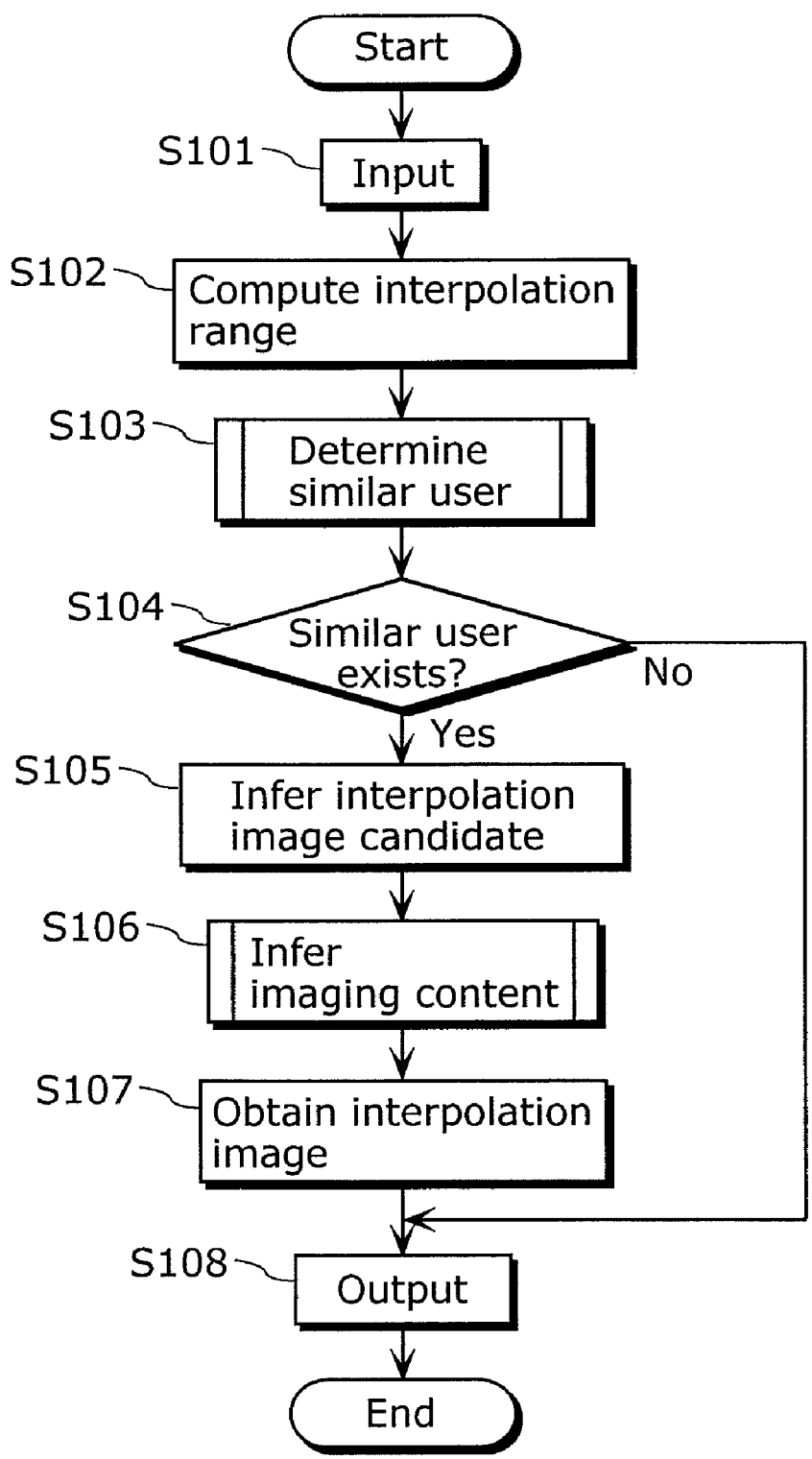
FIG. 10 is a flowchart showing flow of overall processing performed by the image search device according to Embodiment 1 of the present invention.

FIG. 10 is a flowchart showing the flow of overall processing performed by the image search device 100.

First, the input unit 103 receives the image IDs 23 of the image content data 20 taken by the user, and the image IDs 23 of the interpolation target images to which the user wishes to interpolate among the image IDs 23 of the image content data 25. Then, the input unit 103 notifies the interpolation range computing unit 104 and the similar user determining unit 105 of the received image IDs 23 of the interpolation target images (Step S101).

Next, the interpolation range computing unit 104 obtains, from the image database 101, the photographing locations 26 and the photographing time and date corresponding to the image IDs 23 of the interpolation target images notified from the input unit 103. Then, the interpolation range computing unit 104 computes, using the obtained photographing locations 26 and photographing time and date 25, the interpolation range indicating the range of target area of interpolation. Further, the interpolation range computing unit 104 notifies the interpolation image candidate obtaining unit 106 of the computed interpolation range (Step S102).

More particularly, for example, the interpolation range computing unit 104 computes, as the interpolation range, the range whose center is the centroid of the photographing locations 26 (latitude and longitude) of the interpolation target images and whose distance of radius is proportional to the elapsed time obtained by the photographing time and date 25 of the interpolation target images. Here, the elapsed time is the difference between the photographing time and date 25 of the interpolation target images. Note that when there are three or more interpolation target images, the elapsed time is determined to be the difference between the oldest photographing time and date 25 and the latest photographing time and date 25 among the photographing time and date 25 of the three or more interpolation target images.

Further, the interpolation range computing unit 104 may select, from among multiple predetermined ranges, a range including the photographing locations 26 (latitude and longitude) of the interpolation target images as the interpolation range. In this case, the interpolation range computing unit 104 may add a range adjacent to the selected range to the interpolation range according to the elapsed time between the interpolation target images.

Further, when the elapsed time obtained by the photographing time and date 25 of the interpolation target images is equal to or greater than predetermined threshold, the interpolation range computing unit 104 may present the ranges as shown in FIG. 5 so that the user can designate the interpolation range. With this, the interpolation range computing unit 104 can prevent that the interpolation range becomes too large and that the interpolation range is incorrectly computed.

Next, the similar user determining unit 105 refers to the image database 101 to detect one or more other users (similar user) having a group of images that are similar to the image content data 20 corresponding to the image IDs 23 notified from the input unit 103 (Step S103).

Figure 11:
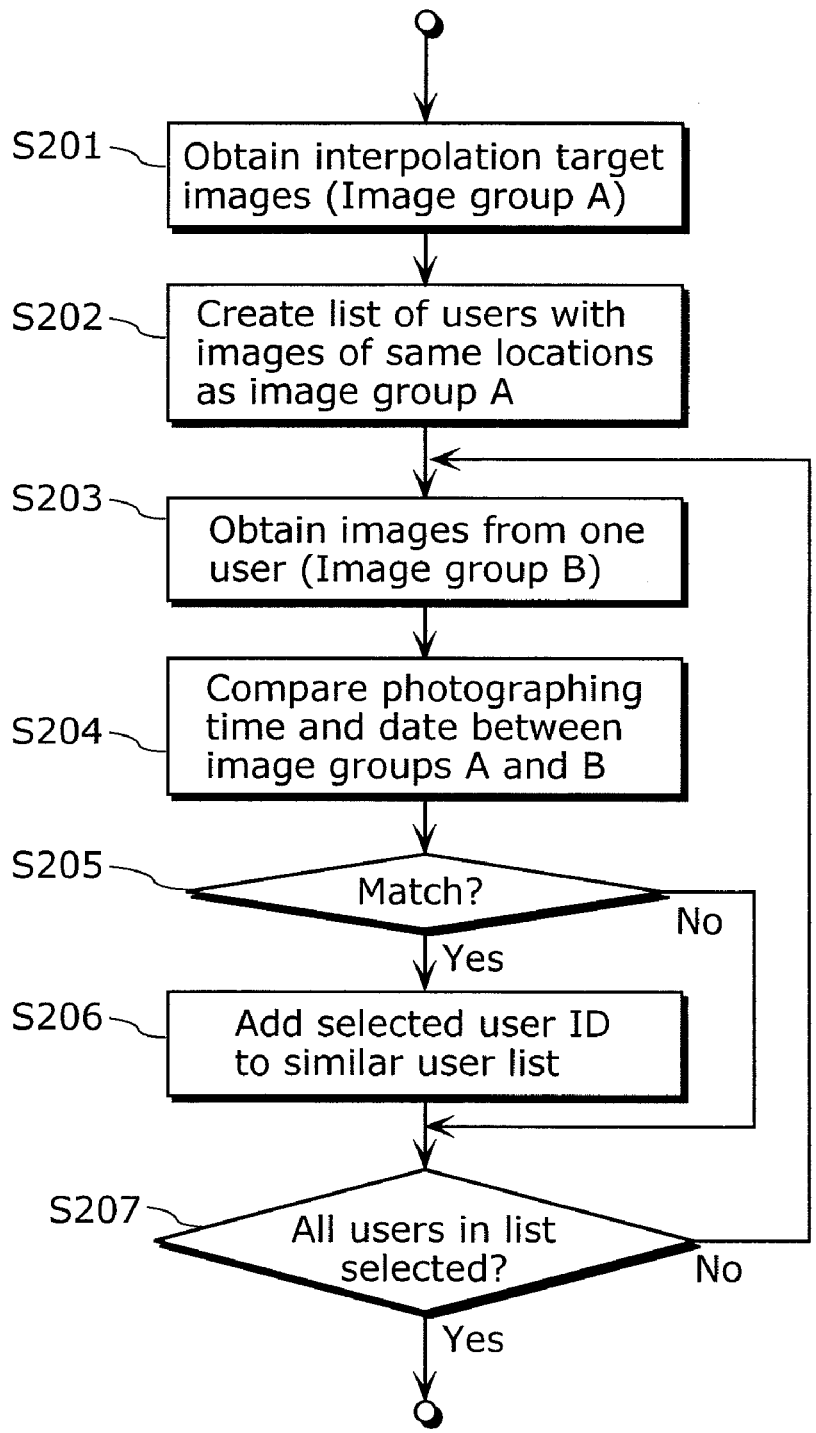
FIG. 11 is a flowchart showing flow of detailed processing of steps related to determination of similar users shown in FIG. 10.

FIG. 11 is a flowchart showing the detailed processing of the step (Step S103) for determining a similar user shown in FIG. 10. Hereinafter, with reference to FIG. 11, the processing performed by the similar user determining unit 105 for determining a similar user is described.

First, the similar user determining unit 105 obtains all the interpolation target images (hereinafter, image group A) provided to the input unit 103 (Step S201).

Next, the similar user determining unit 105 refers to the image database 101 to obtain one or more other users which have the image content data 20 that match the photographing locations 26 of the image group A obtained in the Step S201. Then, the similar user determining unit 105 creates a user list including the obtained users (step S202). Here, the matching of the photographing locations refers to the case where the distance between the photographing locations is equal to or less than predetermined threshold. More particularly, for example, when the distance between the photographing locations of two images is 1 km or less, the photographing locations of the two images match one another. Here, the distance can be considered as a difference between latitudes and a difference between longitudes. For example, when the differences of the latitudes and the longitudes between the two images are 0.3 degree or less, the photographing locations of the two images can be considered to match one another.

Next, the similar user determining unit 105 selects, from the user list created in Step S202, one user (other user), and obtains image content data 20 of the selected user (hereinafter, referred to as image group B) (Step S203).

Next, the similar user determining unit 105 computes the sum of the differences of the photographing time (time difference values) between the image content data 20 of the image group A obtained in step S201 and the image content data 20 of the image group B whose photographing location match the photographing locations of the image content data 20 of the image group A (Step S204). Here, the time difference value refers to the difference between time (time, minute, and second) at which the images were taken. More specifically, the time difference value is computed without consideration of the date (year-month-day) at which the images were taken.

Next, the similar user determining unit 105 determines whether or not the sum of the time difference values computed in Step S204 is equal to or less than threshold value (Step S205). Note that the threshold is predetermined, for example, as 30 minutes.

Here, when the sum of the time difference values is equal to or less than the threshold (Yes in Step S205), the similar user determining unit 105 obtains the user ID corresponding to the user selected in Step S203. Then, the similar user determining unit 105 registers the obtained user ID to the similar user list as a similar user (Step S206). On the other hand, when the time difference value is greater than the threshold (No in Step S205), the processing continues at Step S207.

Next, the similar user determining unit 105 determines whether or not all the users in the user list obtained in Step S202 have been selected (Step S207). Here, in the case where all the users have been selected, the processing continues at Step S104 shown in FIG. 10. On the other hand, in the case where all the users have not been selected, the similar user determining unit 105 repeats the processing of Step S203 to S206.

Accordingly, by performing the processing of Steps S201 to S207, the similar user determining unit 105 can obtain, as the similar image group, the image group including the image content data 20 whose photographing time and date and photographing location match those of the interpolation target images. More specifically, it is possible to obtain one or more other users (similar users) who took the images whose photographing locations and time of day match those of the interpolation target images. To be more specific, the similar user determining unit 105 can detect, from among a large number of images which include the subject that the user wishes to use for interpolation, only the image group of other users who performed similar photographing pattern as the user.

It is to be noted that the determination of the similar users based on the photographing time by the similar user determining unit 105 is highly effective when obtaining other users who performed activities that is similar to the user and is correlated with time. For example, in the case where the photographing time of the interpolation target image (Kiyomizu temple) 60 is 11:00 a.m., and the photographing time of the interpolation target image (Ginkaku temple) 61 is 14:00, there is a lunch time between them. Thus, the user highly likely had a lunch after taking the interpolation target image (Kiyomizu temple) 60 and before taking the interpolation target image (Ginkaku temple) 61. Since the similar users (other users) have images taken at the same time of day, the similar users highly likely have images related to lunch. More specifically, the similar user determining unit 105 can obtain many images related to lunch which are the images that the user highly likely wishes to use for interpolation.

In step S204, the similar user determining unit 105 may compute the difference of the photographing year between the images of the image group A obtained in Step S201 and the images of the image group B whose photographing locations 26 match those of the images of the image group A. With this, in the case where the user wishes to interpolate the image of the subject whose imaging content differs greatly depending on year, the similar user determining unit 105 can effectively obtain the images that the user wishes to use for interpolation.

Further, in Step S204, the similar user determining unit 105 may compute the difference of the photographing month between the images of the image group A obtained in Step S201 and the images of the image group B whose photographing locations 26 substantially match those of the images of the image group A. With this, in the case where the user wishes to interpolate the image of the subject whose imaging content differs greatly depending on month, the similar user determining unit 105 can effectively obtain the images that the user wishes to use for interpolation.

Further, in Step S204, the similar user determining unit 105 may compute the difference of the photographing time between all the images of the image group A obtained in Step S201 and the images of the image group B selected in the Step S203. With this, the similar user determining unit 105 can obtain the images of other users who took images at the same photographing locations in the photographing order different from the user. More specifically, even when the user wishes to interpolate the images of the activities that does not affect the photographing order, the similar user determining unit 105 can effectively obtain such images that the user wishes to use for interpolation.

Here, description is continued at FIG. 10.

Next, the similar user determining unit 105 determines whether or not the detected similar user is registered in the similar user list (Step S104). Here, when no similar user is registered (when no similar user exists) (No in Step S104) the processing is continued at Step S108.

On the other hand, when the similar user is registered in the similar user list (when similar users exist) (Yes in Step S104), the similar user determining unit 105 notifies the interpolation image candidate obtaining unit 106 of the user ID 22 registered as the similar user. Further, the interpolation image candidate obtaining unit 106 refers to the image database 101 to obtain the image content data 20 (candidate images). The photographing locations of the obtained image content data 20 belong to the interpolation range received from the interpolation range computing unit 104, and the user ID of the obtained image content data 20 match the user ID of the similar user notified by the similar user determining unit 105. Further, the interpolation image candidate obtaining unit 106 notifies the imaging content inferring unit 107 of the image IDs 23 of the obtained candidate images (Step S105).

Next, the imaging content inferring unit 107 infers the imaging content that the user would be interested in, based on the image IDs 23 notified by the interpolation image candidate obtaining unit 106 and the degree-of-association database 102. Subsequently, the imaging content inferring unit 107 notifies the interpolation image obtaining unit 108 of the inferred imaging content and the image IDs of the candidate images (Step S106). The candidate images obtained by the interpolation image candidate obtaining unit 106 are similar to the interpolation target images in pattern of photographing location and photographing time; however, the imaging content are not always similar to each other. Here, the imaging content inferring unit 107 narrows down the candidate images to the images similar to the imaging content that the user wishes to use for interpolation.

Figure 12:
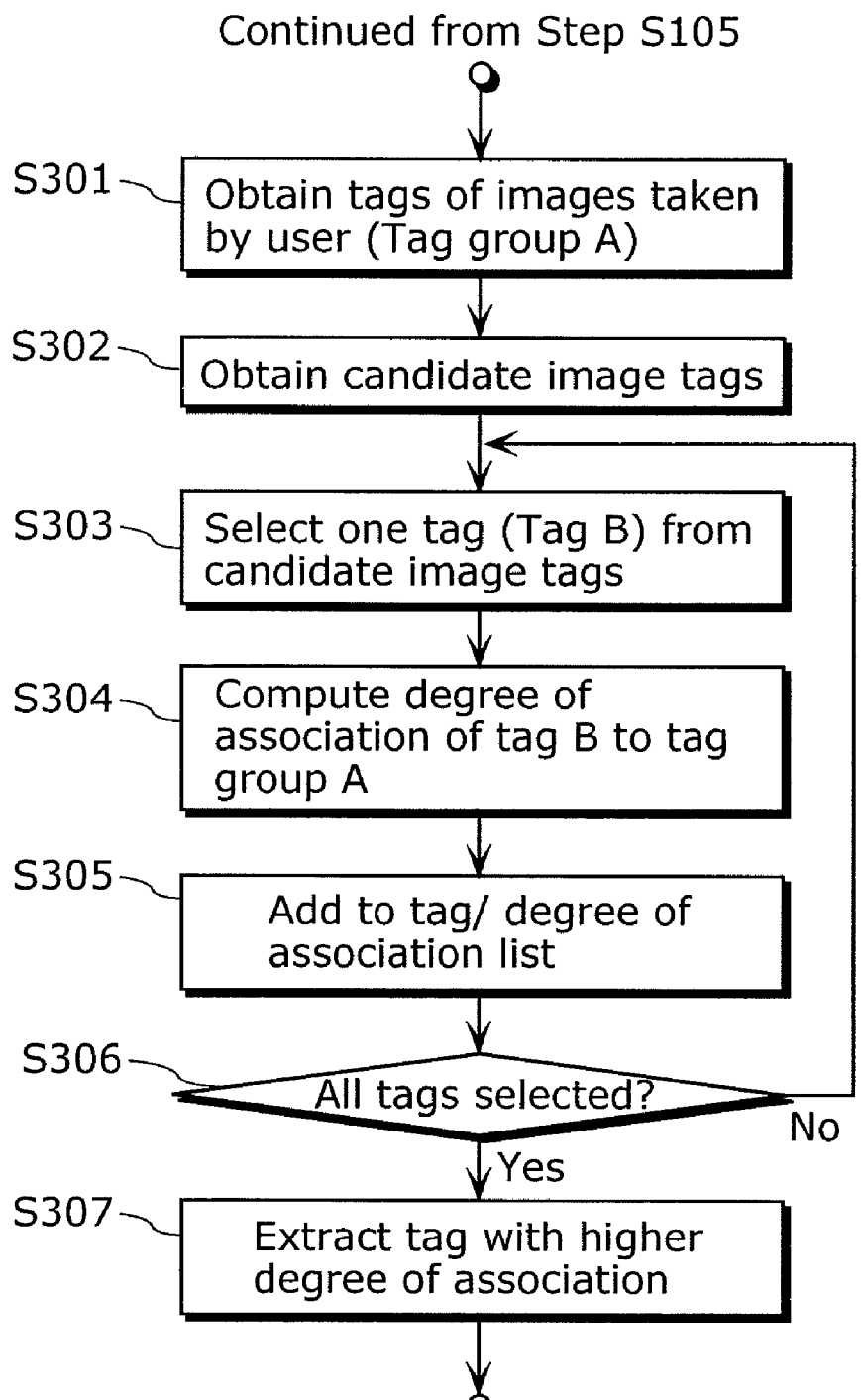
FIG. 12 is a flowchart showing flow of detailed processing of steps related to inferring of imaging content shown in FIG. 10.

FIG. 12 is a flowchart showing flow of the detailed processing of the step (Step S106) for inferring imaging content shown in FIG. 10. Hereinafter, with reference to FIG. 12, the processing performed by the imaging content inferring unit 107 for inferring the imaging content is described. Here, the "imaging content" is defined as the tag 27 attached to the image content data 20. Then, the imaging content inferring unit 107 infers the tags 27 similar to the imaging content of the user.

First, the imaging content inferring unit 107 obtains, from the image database 101, the tags 27 attached to the interpolation target images provided to the input unit 103 (Step S301). Hereinafter, the tags obtained in Step S301 are referred to as tag group A.

Next, the imaging content inferring unit 107 obtains, from the image database 101, the tags 27 of all the candidate images obtained by the interpolation image candidate obtaining unit 106 (Step S302).

Next, the imaging content inferring unit 107 selects one tag 27 from among the tags 27 of the candidate images obtained in Step S302 (Step S303). Hereinafter, the tag 27 selected in Step S303 is referred to as tag B.

Next, the imaging content inferring unit 107 computes the degree of association of the tag B with respect to the tag group A obtained in Step S301 (Step S304). Here, the imaging content inferring unit 107 refers to the degree-of-association database 102 for the area to which the photographing location 26 of the tag group A belongs, so as to obtain the degree of association of the tag B with respect to the respective tags 27 included in the tag group A. Then, the imaging content inferring unit 107 computes the degree of association of the tag B with respect to the tag group A through total addition of the obtained degree of association.

Figure 13:
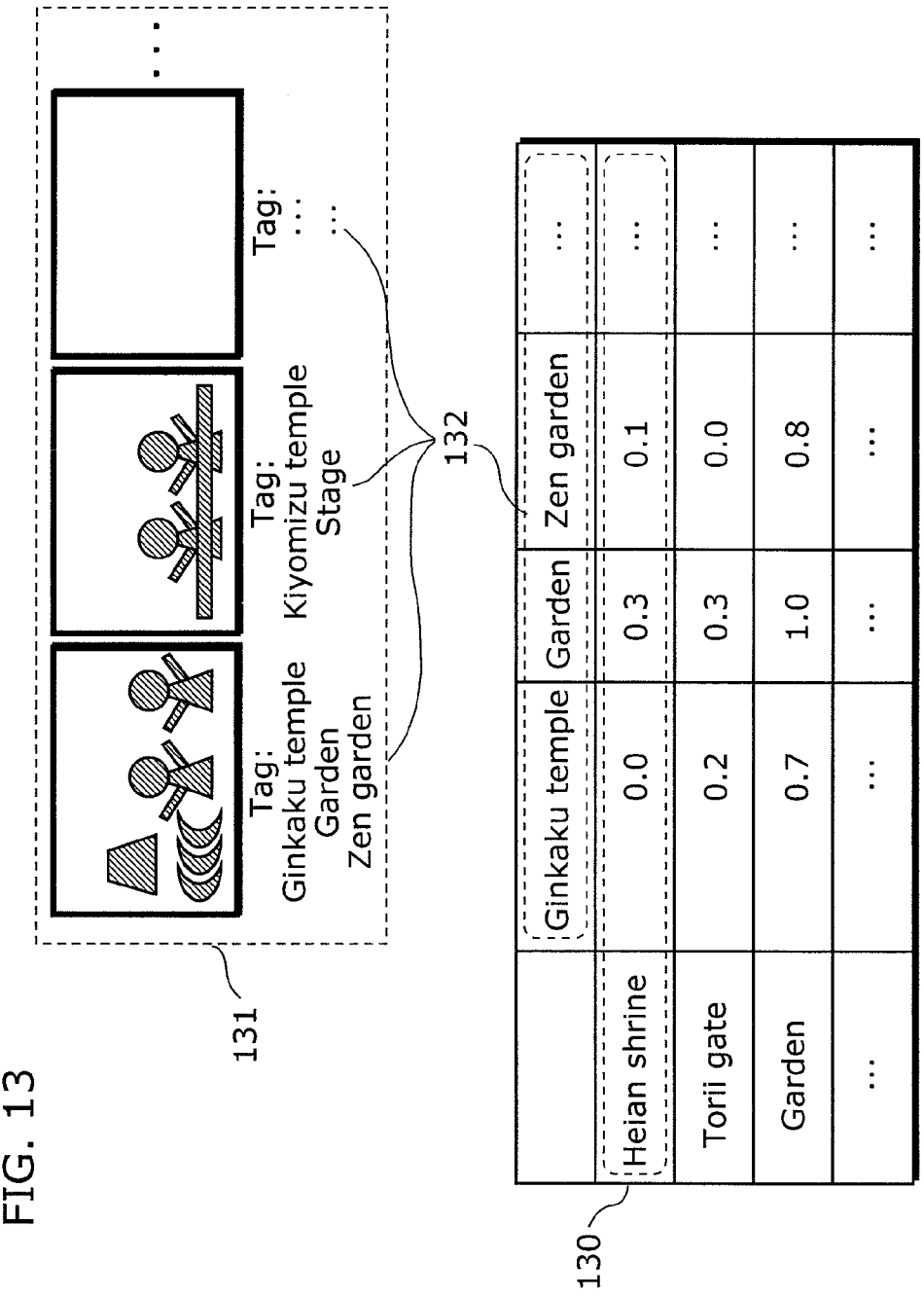
FIG. 13 is a diagram showing an example of a degree-of-association database.

FIG. 13 is a diagram showing an example of the degree-of-association database 102 which stores the degree of association between the tags of the candidate images ("Heian shrine", "Torii gate" and "Garden" (each tag B)) and the interpolation target image tags 132 that are the tags 27 of the interpolation target images 131 ("Ginkaku temple", "Garden", and "Zen garden" (tag group A). In FIG. 13, the degree of association of the "Heian shrine" can be computed by adding the degree of association with "Ginkaku temple", "Garden", and "Zen garden" or the like (dashed line part 130). In the example shown in FIG. 13, the degree of association of the "Heian shrine" is 0.0+0.3+0.1=0.4. Similarly, the degree of association of the "Torii gate" is 0.5, and the degree of association of the "Garden" is 2.5.

Next, the imaging content inferring unit 107 stores the degree of association computed in Step S304 as well as the tag B in a tag/degree of association list (Step S305).

Next, the imaging content inferring unit 107 determines whether or not all the tags 27 of the candidate images obtained in Step S302 have been selected (Step S306).

Here, when all the tags 27 have been selected (Yes in Step S306), the imaging content inferring unit 107 infers, from among the tag/degree of association list, tags with higher degree of association as the imaging content that the user wishes to interpolate (Step S307). For example, in the example shown in FIG. 13, the imaging content inferring unit 107 infers the tag "Garden" having the degree of association greater than threshold "1" as the imaging content that the user wishes to use for interpolation.

On the other hand, when all of the tags have not been selected (No in Step S306), the imaging content inferring unit 107 repeats the processing of Step S303 to S306.

As described, by performing the processing of Step S301 to S307, the imaging content inferring unit 107 can extract, from among the candidate images obtained by the interpolation image candidate obtaining unit 106, the tags 27 which is highly associated with the imaging content of the user as the imaging content of the interpolation image.

Here, description is continued at FIG. 10.

Next, the interpolation image obtaining unit 108 obtains, from the imaging content notified by the image content inferring unit 107 and the image IDs 23 of the candidate images, the candidate images corresponding to the imaging content as the interpolation images, and notifies the output unit 109 of the obtained interpolation images (Step S107).

Lastly, the output unit 109 outputs, to the output medium, the interpolation images obtained by the interpolation image obtaining unit 108 (Step S108).

Figure 14:
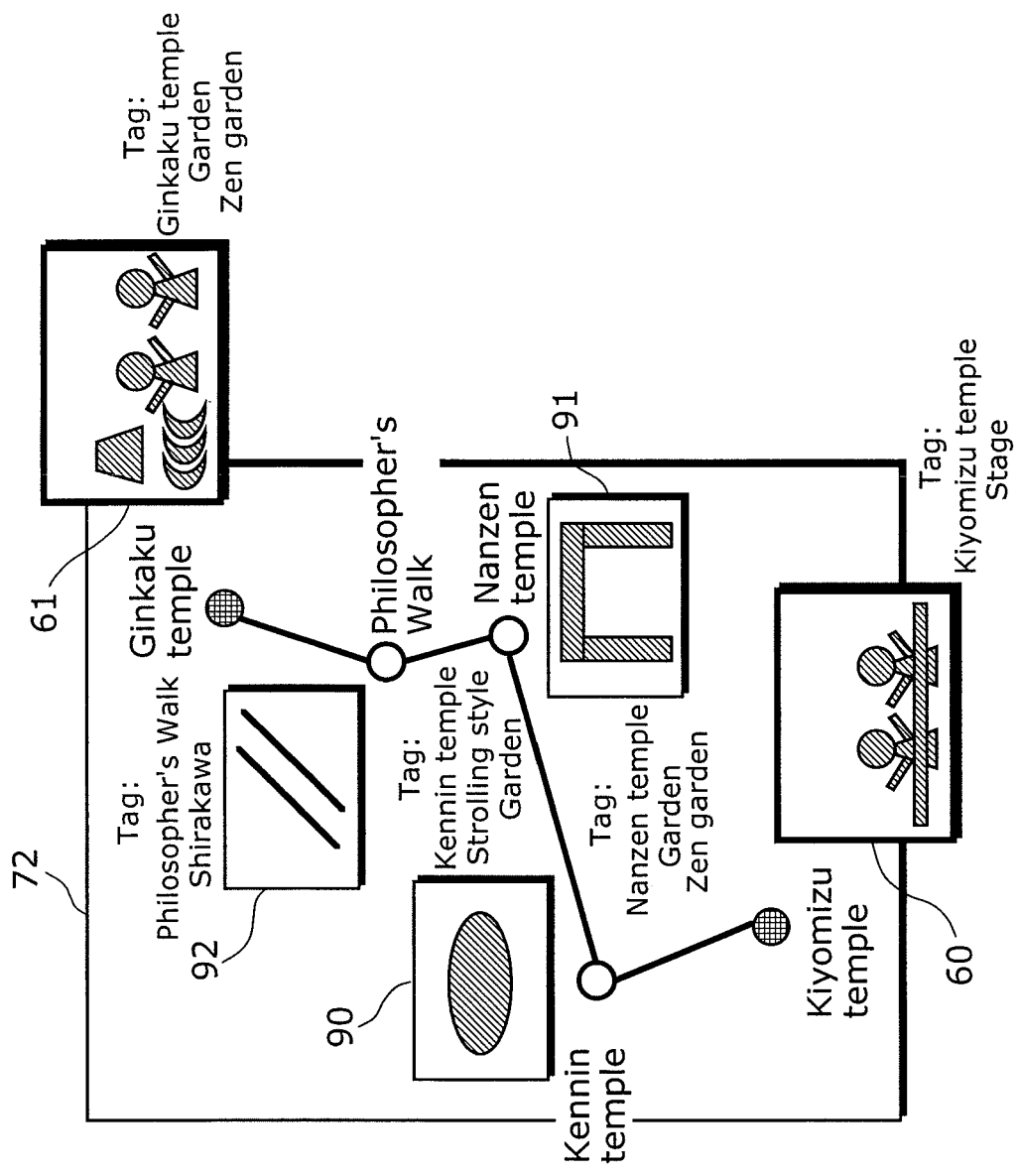
FIG. 14 is a diagram showing an example of a screen provided to an output medium by an output unit.
Figure 15:
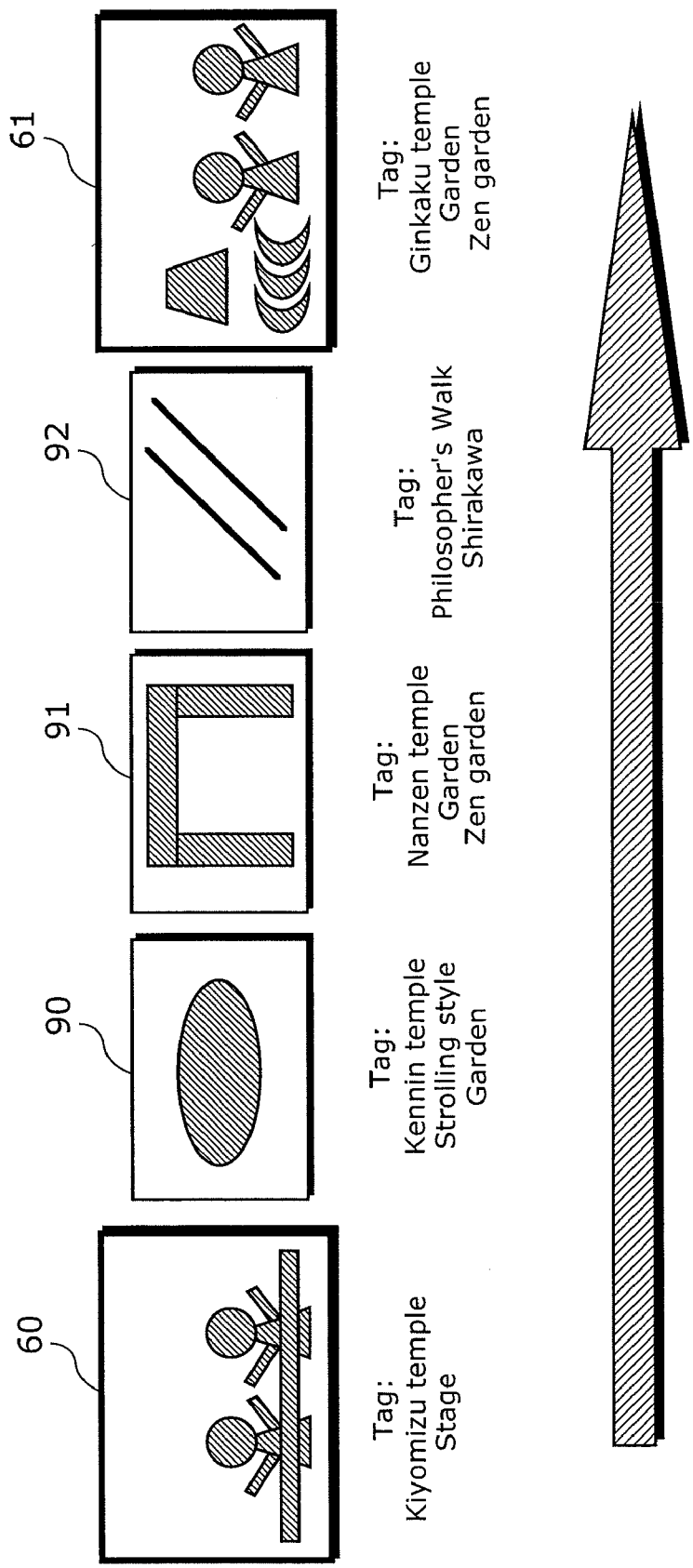
FIG. 15 is a diagram showing another example of the screen provided to the output medium by the output unit.

FIG. 14 and FIG. 15 each is a diagram showing an example of a screen provided to the output medium by the output unit 109. As shown in FIG. 14, the output unit 109 may display a list of the interpolation images on a map or the like. Further, as shown in FIG. 15, the output unit 109 may display the interpolation images in the order of closeness to the photographing location in a slide show format.

As described, by performing the processing of Step S101 to Step S108, the image search device 100 can infer the imaging content of the interpolation images; and thus, the image search device 100 can obtain, as the interpolation images from among a large amount of stored images, images of other users who took similar photos.

Note that the image database 101 may store only the images that the user took by himself or herself. In this case, the user can easily create a photo album using only the images took by himself or herself as long as the images were taken at the same area.

Embodiment 2

Next, an image search device 200 according to Embodiment 2 of the present invention is described.

The image search device 200 according to the present embodiment is characterized in that activity information that is information on activities of the user during the user's trip is inferred as imaging content. Here, the activity information refers to words (keywords) which represent activities of the user during the trip, such as "Eat", "Entertainment", "See", and "Stay". Further, the activity information is, for example, set to an activity tag which is a part of the tag 27 of the content associated information 21.

The image search device 100 according to Embodiment 1 selects the interpolation images from among the images taken by similar users, by inferring the imaging content using the subject information, that is, for example, the name of the place or building that the user visited during the trip. However, the image search device 100 infers the subject information as the imaging content; and thus, the image search device 100 cannot specify the activity information of the user when obtaining the interpolation images. For example, when the subject information that is "Nanzen temple" is inferred, it is not possible to determine whether the image was taken when the user had a meal at Nanzen temple, the image taken when the user did sightseeing at Nanzen temple, or the image taken when the user stayed overnight at Nanzen temple. If the activity information of the interpolation images can be inferred from the images taken by the user, the image search device can select, from the images taken by the similar users, the interpolation images in accordance with the activity of the user during the trip. As a result, the image search device can efficiently present, to the user, the images that the user wishes to use for interpolation, thereby improving user-friendliness.

Thus, the image search device 200 according to the present embodiment infers the activity information of the interpolation images as imaging content, using the activity tags, photographing time photographing locations of the images taken by the user.

Hereinafter, with reference to FIG. 16, each element of the image search device 200 is described in order.

Figure 16:
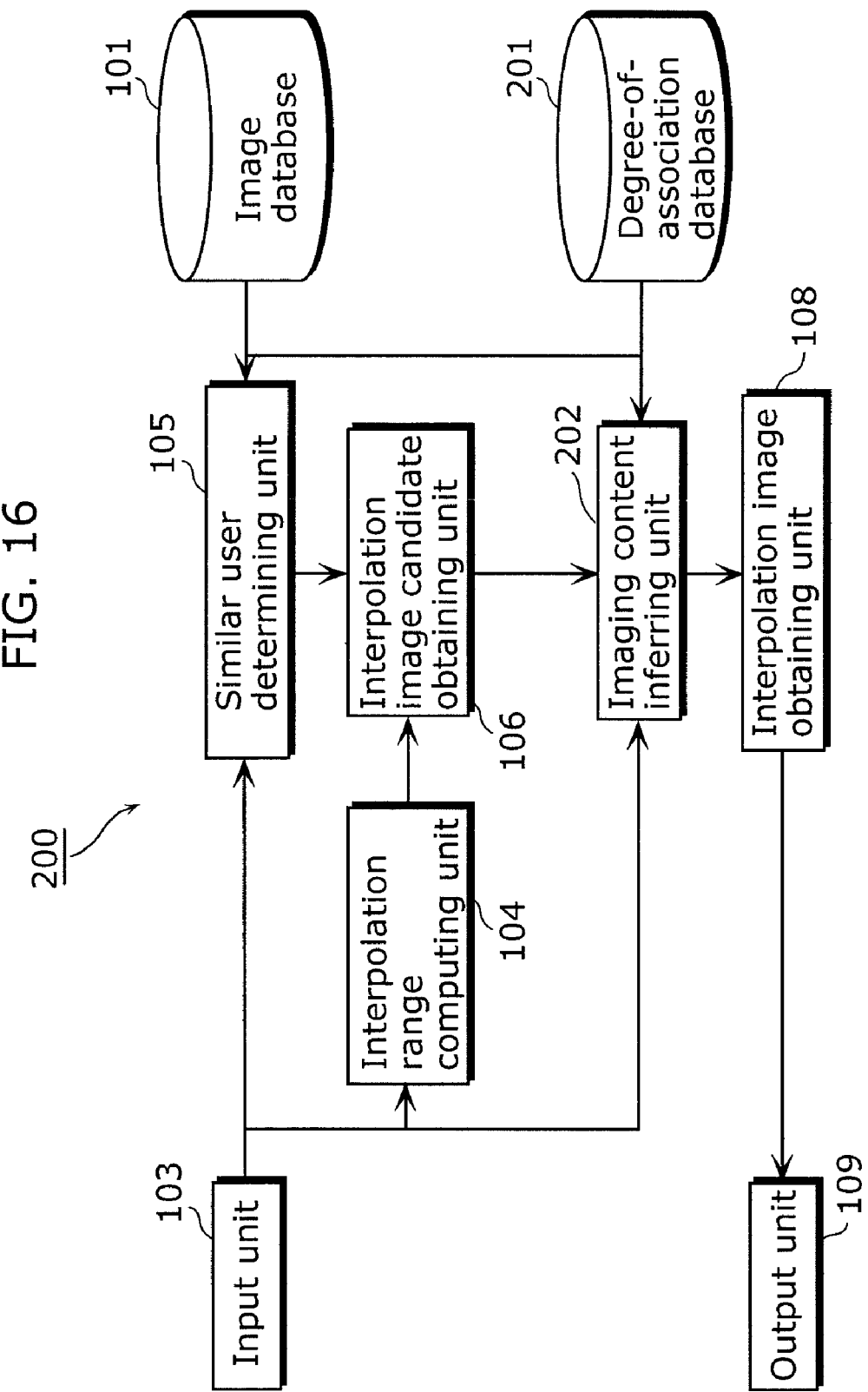
FIG. 16 is a block diagram showing a characteristic functional structure of an image search device according to Embodiment 2 of the present invention.

FIG. 16 is a block diagram showing characteristic functional structure of the image search device 200 according to Embodiment 2 of the present invention. In FIG. 16, the same referential numbers are assigned to elements having the same function of those of the image search device 100 shown in FIG. 1. One difference between the image search device 200 shown in FIG. 16 and the image search device 100 shown in FIG. 1 is that the degree-of-association database 201 in the image search device 200 stores the degree of association between photographing time of day and activity information of the interpolation target image for each area. Further, another difference is that the imaging content inferring unit 202 of the image search device 200 infers, as the imaging content, the activity information of the interpolation images from the candidate images.

Figure 17:
FIG. 17 is a diagram showing an example degree-of-association database.

FIG. 17 is a diagram showing an example of the degree-of-association database 201. The degree-of-association database 201 stores, for each area, the degree of association between the activity tags and photographing time of day of the image content data 20 belonging to each area.

For example, the user sets, to the activity tags, predetermined activity information, such as "Eat" "See" "Entertainment" and "Stay" when uploading the image content data 20 to the image database 101. Then, the degree of association is computed by normalizing, for each photographing time of day, appearance frequency of the activity tags thus set. In the example of FIG. 17, in "area 1", the degree of association corresponding to the photographing time "9:00 to 11:00" and the activity information "See" is "0.8". This value "0.8" indicates that in the case where there are one thousand items of image content data 20 whose photographing locations belonging to the area 1 and photographing time is between 9:00 a.m. to 11:00 a.m., there are eight hundred items of image content data 20, out of one thousand items of image content data 20, which have activity tag set to the activity information "See". Further, the degree-of-association database 201 may use a general association thesaurus, and hold the degree of association between the tags 27 preset by the user and activity information as a separate table. Then, the degree-of-association database 201 may store the average values of the degree of association between the tags 27 attached to the image content data 20 and the activity tags.

The imaging content inferring unit 202 infers the activity information of the interpolation image as the imaging content based on the activity tags of the candidate images obtained by the interpolation image candidate obtaining unit 106. Specific inferring method of the imaging content will be described later.

Figure 18:
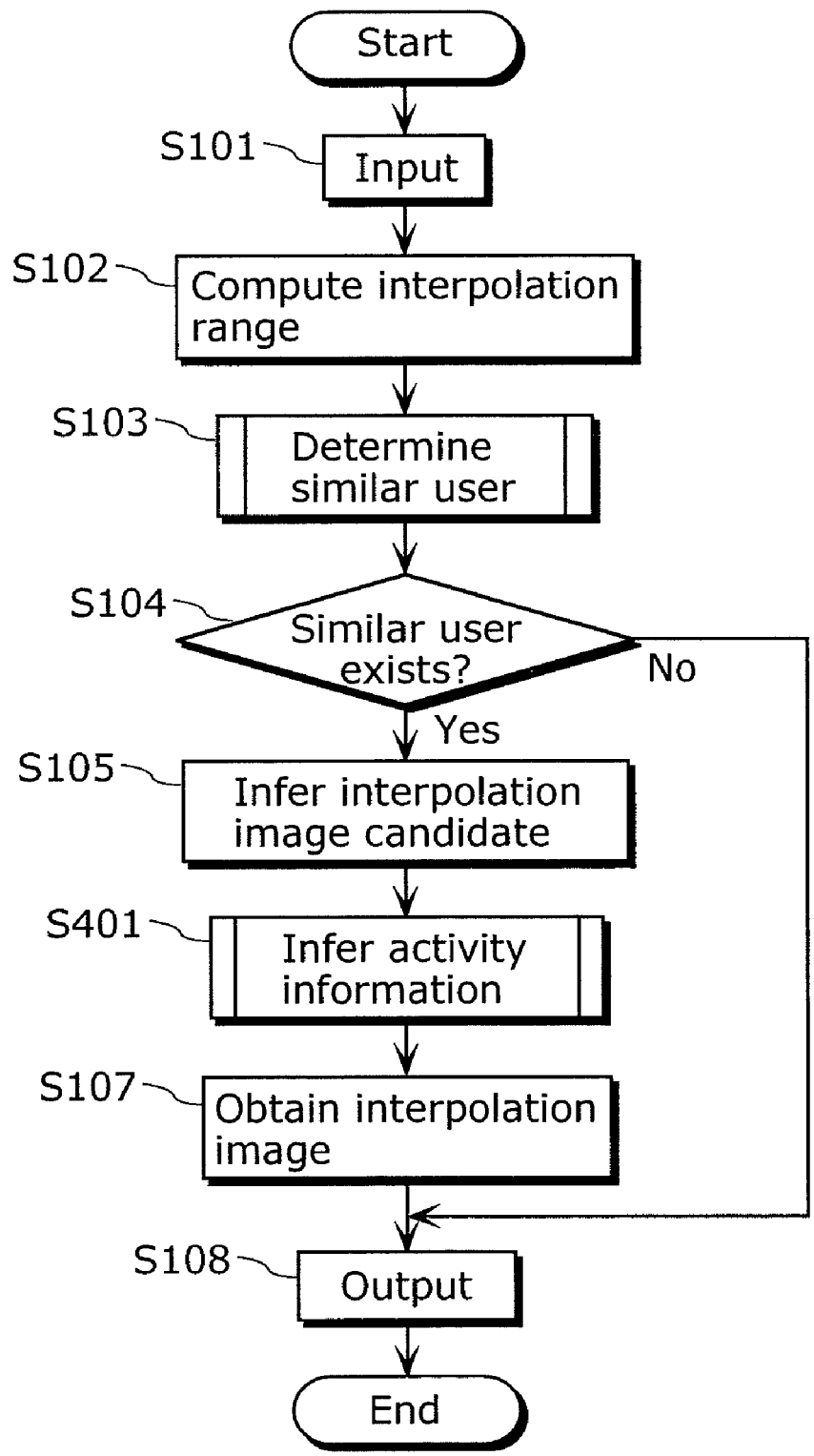
FIG. 18 is a flowchart showing flow of overall processing performed by the image search device according to Embodiment 2 of the present invention.

Next, with reference to the flowchart of FIG. 18, the flow of the overall processing performed in the image search device 200 shown in FIG. 16 is described.

FIG. 18 is a flowchart showing the flow of the overall processing performed by the image search device 200. In FIG. 18, the same referential numbers are assigned to the steps in which the same processing is performed as the processing of the image search device 100 in Embodiment 1 shown in FIG. 10.

In the image search device 200 according to the present embodiment, the processing for inferring the imaging content using the degree-of-association database 201 which stores the degree of association of the activity information is different from the processing performed in the image search device 100 according to Embodiment 1. However, the other processing are the same as those in the image search device 100 in Embodiment 1. More specifically, in FIG. 18, the processing of steps S101 to S105, and steps S107 to S108 performed by the image search device 300 are the same as those performed by the image search device 100 in Embodiment 1 shown in FIG. 10; and thus, descriptions of them are not repeated.

The imaging content inferring unit 202 infers, as the imaging content, the activity information that is highly associated with the image content data 20 photographed by the user, using the degree-of-association database 201 and image IDs 23 of the image content data 20 photographed by the user and notified by the input unit 103 (Step S401).

Figure 19:
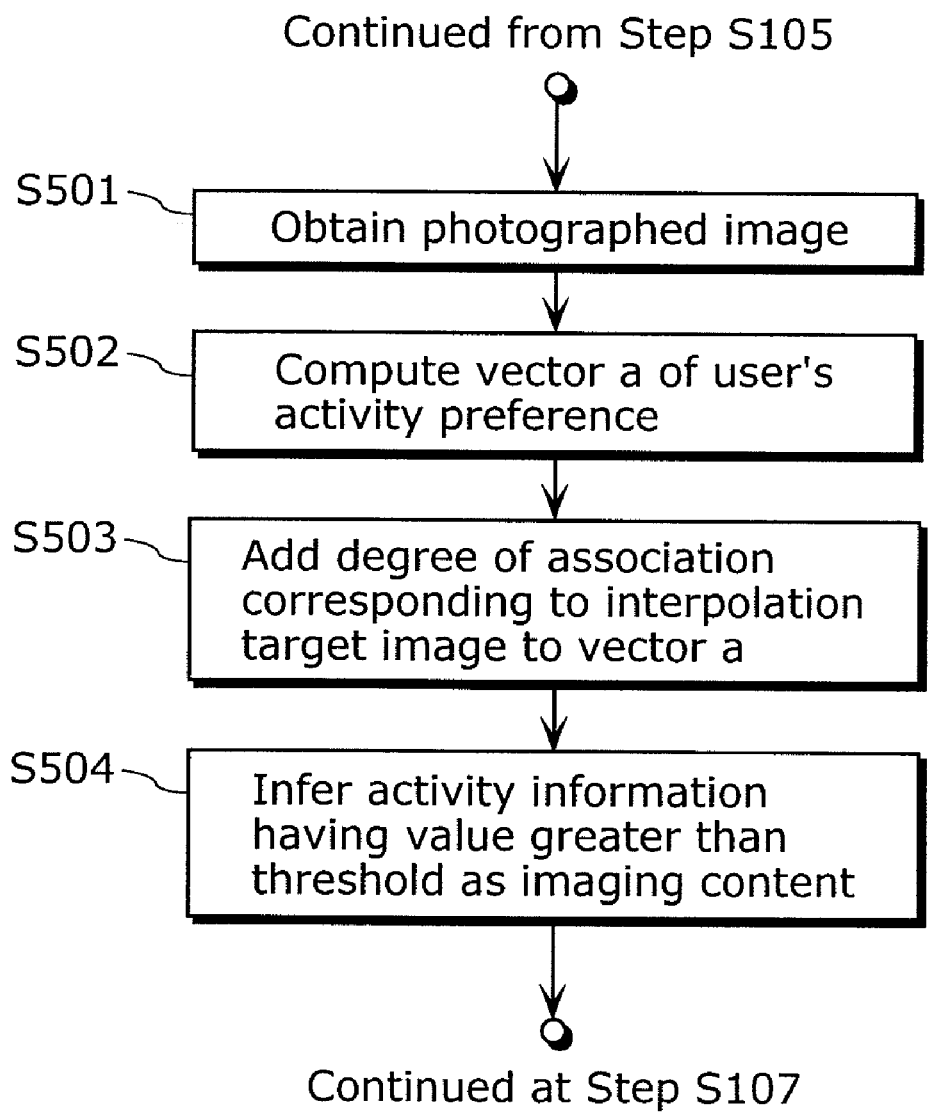
FIG. 19 is a flowchart showing flow of detailed processing of steps related to inferring of imaging content shown in FIG. 18.

FIG. 19 is a flowchart showing the flow of detailed processing of the step (Step S401) for inferring the imaging content shown in FIG. 18. Hereinafter, detailed description is given of the processing performed by the imaging content inferring unit 202 in Step S401, with reference to FIG. 19.

First, the imaging content inferring unit 202 obtains the image IDs 23 of the image content data 20 photographed by the user and notified by the input unit 103 (Step S501).

Next, the imaging content inferring unit 202 obtains activity tags from the image IDs 23 obtained in Step S501 by referring to the image database 101. Then, the imaging content inferring unit 202 computes vector of activity preference of the user from the obtained activity tags (Step S502). Here, the vector of the activity preference refers to the vector representing the user's preference with respect to each activity information as values. The specific computing method of the vector of the activity preference is described with reference to FIG. 20 and FIG. 21.

Figure 20:
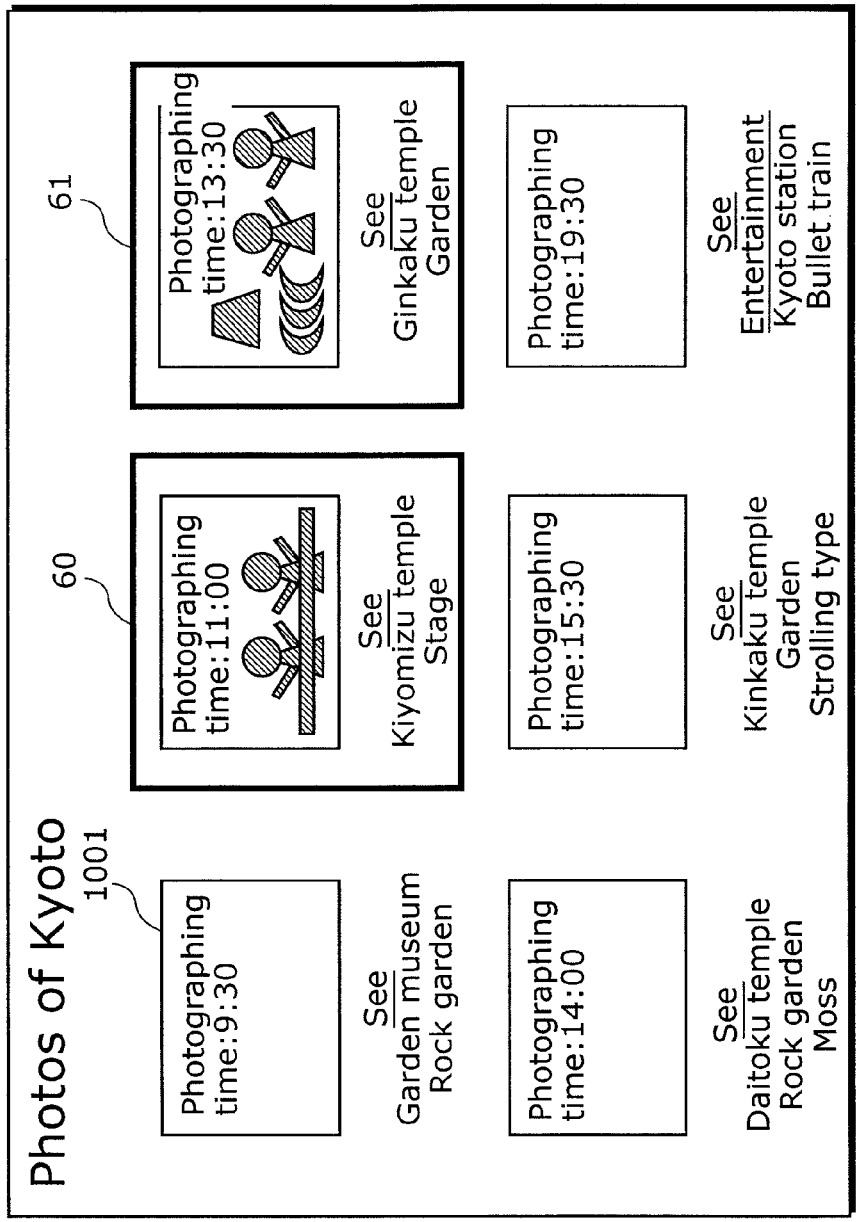
FIG. 20 is a diagram showing an example of image content data taken by a user.

FIG. 20 is a diagram showing an example of image content data 20 photographed by the user in Kyoto, as in Embodiment 1. As shown in FIG. 20, the photographing time tag 27 and the activity tag are assigned to each image content data 20. More specifically, for example, the interpolation target image (Kiyomizu temple) 60 has the activity tag preset to "See", the tag 27 preset to "Kiyomizu temple" and "Stage", and the photographing time preset to "11:00".

The vector of activity preference is a vector having dimensions of the number of kinds of activity information set to the activity tag. Further, the vector value for each kind of activity information of the activity preference vector is computed by averaging the inverse number of the degree of association of the degree-of-association database 201 corresponding to the photographing location and the photographing time of each photographed image. Further, the vector value is obtained with the initial value of the vector value as 1.

FIG. 21 is a diagram showing a part of the degree-of-association database 201 of the area where a photographed image 1001 was taken. With FIG. 21, an example is shown where the vector value for the photographed image 1001 is computed. As shown in FIG. 21, the degree of association corresponding to the photographing location and the photographing time at which the photographed image 1001 shown in FIG. 20 was taken is "0.8". Thus, the inverse number of the degree of association is 1÷0.8=1.25. Accordingly, the activity preference vector at this point is (eat, see, entertainment, stay)=(1, 1.25, 1, 1). By performing this processing for all the photographed images shown in FIG. 20, the activity preference vector indicating the activity preference of the user is computed.

Here, description is continued at FIG. 19.

Next, the imaging content inferring unit 202 adds the degree of association corresponding to the interpolation target image, to the activity preference vector computed in Step S502 (Step S503).

Next, the imaging content inferring unit 202 infers, as the imaging content, the activity information having vector value equal to or greater than threshold value from among the activity preference vectors computed in Step S503 (Step S504). Here, a designer may set a predetermined value in advance with respect to the threshold value. Further, for example, the imaging content inferring unit 202 may infer the top two activity information as the imaging content.

As described, by performing the processing of Step S501 to S504, from among the candidate images obtained by the interpolation image candidate obtaining unit 106, only the activity information having high degree of association with the activity of the user at the time of photographing can be inferred as the imaging content.

Accordingly, by performing the processing of Steps S101 to S105, Step S401, and Steps S107 to S108, the user can obtain the interpolation images on activity information basis. Thus, the image search device 200 can reduce the number of images to be displayed that does not match the activities of the user during the trip; thereby improving user-friendliness.

Embodiment 3

Next, an image search device 300 according to Embodiment 3 of the present invention is described.

The image search device 300 according to the present embodiment is characterized in that the interpolation image is modified so that the modified interpolation image matches the photographing condition that the user prefers. Here, the photographing condition indicates Exif information such as color information (RGB ratio), aperture, subject distance, resolution, F value, and shutter speed.

In the image search devices 100 and 200 in embodiment 1 and 2, the output unit 109 outputs, as the interpolation image, the image content data 20 stored in the image database 101 without any modification. However, in the case where the image search device outputs, as the interpolation image, the image content data 20 photographed with photographing condition different from the photographing condition of the interpolation target image, the interpolation target image and the interpolation image may lack unity.

Thus, the image search device 300 according to the present embodiment modifies the interpolation image based on the photographing condition of the image provided to the input unit 103.

Hereinafter, with reference to FIG. 22, each element of the image search device 300 is described in order.

Figure 22:
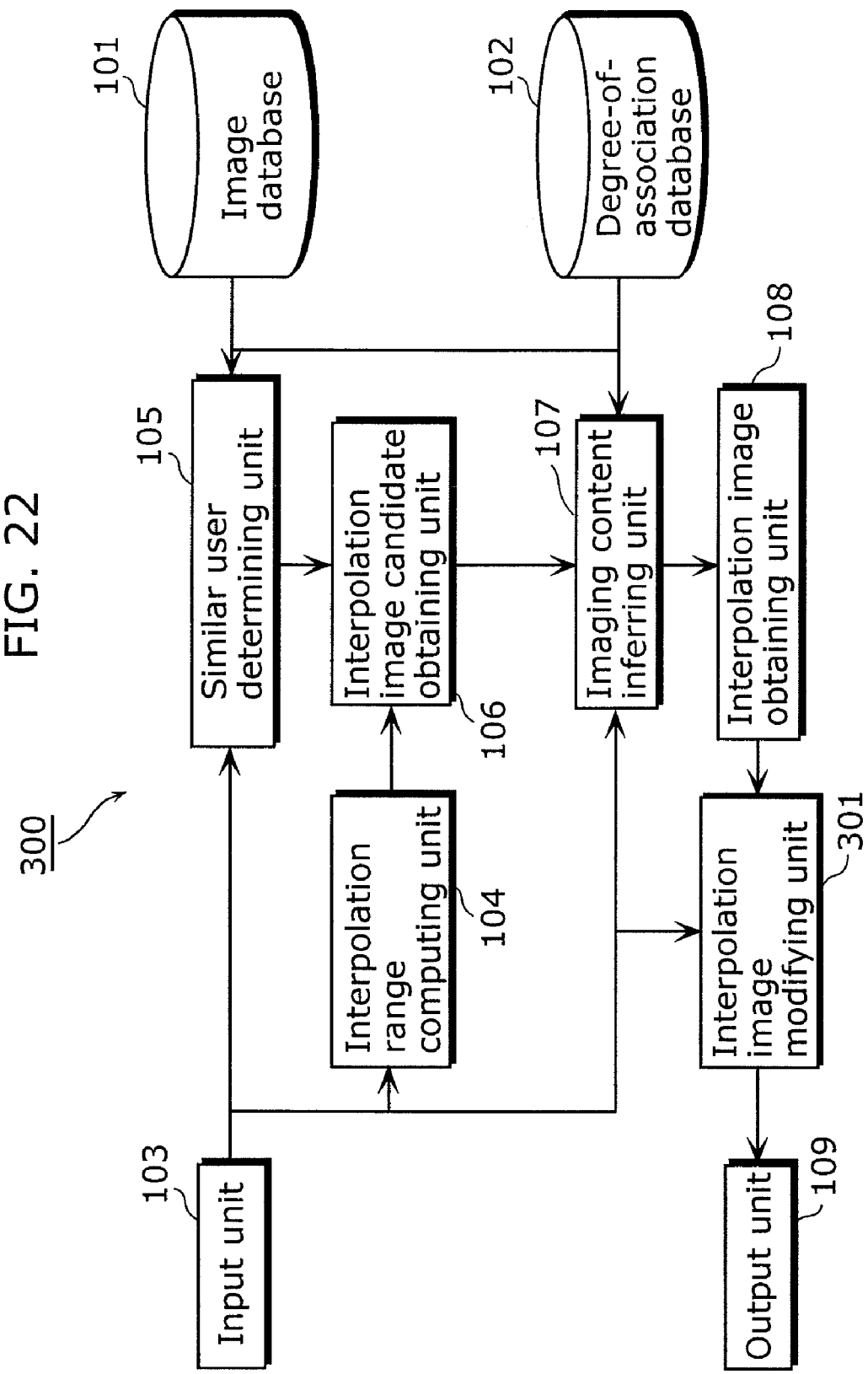
FIG. 22 is a block diagram showing a characteristic functional structure of an image search device according to Embodiment 3 of the present invention.

FIG. 22 is a block diagram showing characteristic functional structure of the image search device 300 according to Embodiment 3 of the present invention. In FIG. 22, the same referential numbers are assigned to elements having the same function of those of the image search device 100 shown in FIG. 1. The image search device 300 shown in FIG. 22 differs from the image search device 100 shown in FIG. 1 in that the image search device 300 shown in FIG. 22 includes an interpolation image modifying unit 301 which modifies the interpolation image based on the photographing condition of the image provided to the input unit 103.

The interpolation image modifying unit 301 computes the photographing condition that the user prefers, using the content associated information 21 corresponding to the image ID 23 notified by the input unit 103. Further, the interpolation image modifying unit 301 modifies the interpolation image based on the computed photographing condition. That is, the interpolation image modifying unit 301 is an example of a photographing condition determining unit, and determines the photographing condition for modifying the interpolation image based on the photographing condition of the interpolation target image provided to the input unit 103. Further, the interpolation image modifying unit 301 modifies the interpolation image obtained by the interpolation image obtaining unit 108 such that the modified interpolation image looks like the image taken with the determined photographing condition. Specific modifying method of the interpolation image is described later.

Figure 23:
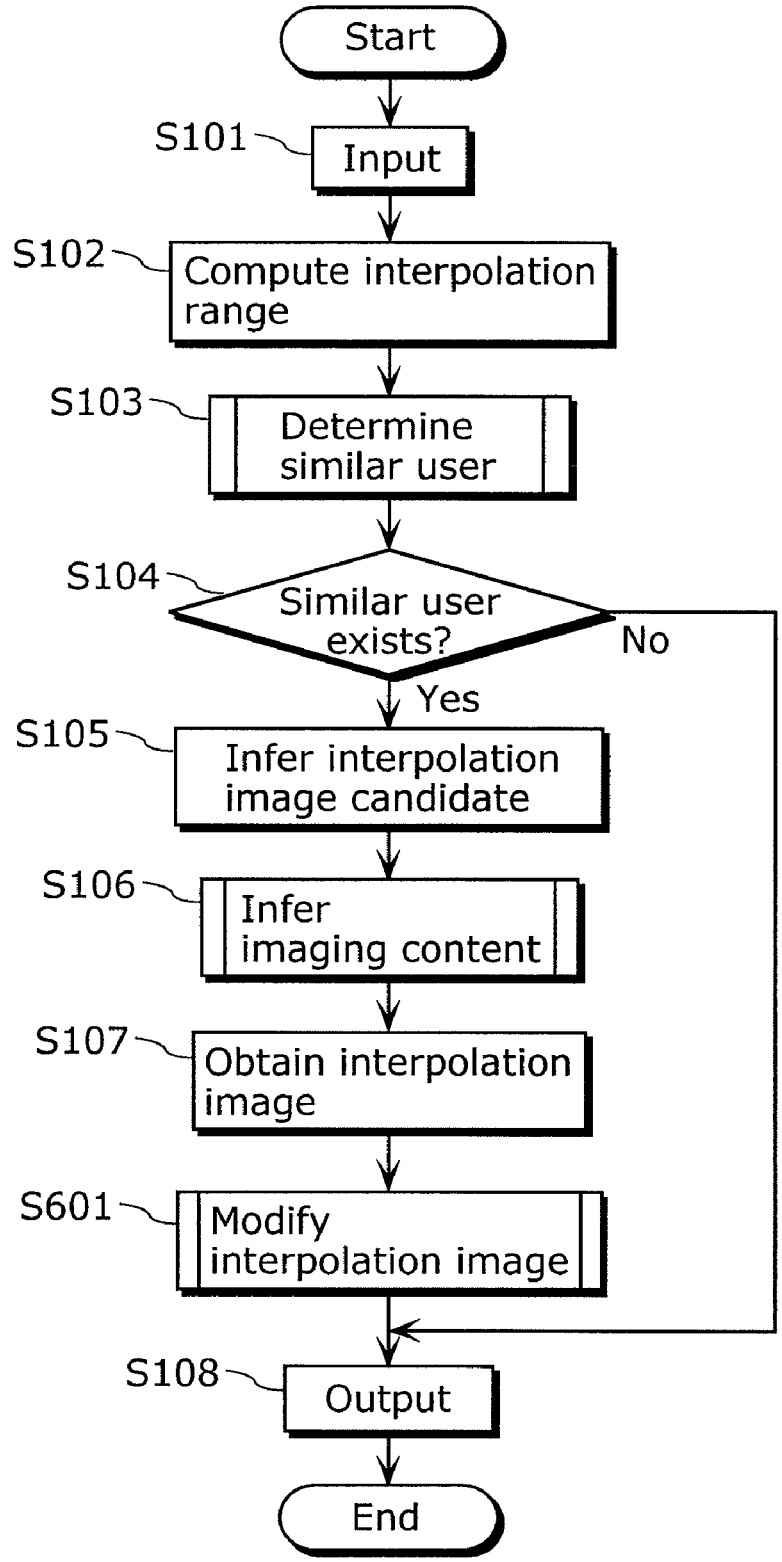
FIG. 23 is a flowchart showing flow of overall processing performed by the image search device according to Embodiment 3 of the present invention.

Next, with reference to the flowchart of FIG. 23, the flow of the overall processing performed in the image search device 300 shown in FIG. 22 is described.

FIG. 23 is a flowchart showing the flow of overall processing performed by the image search device 300. In FIG. 23, the same referential numbers are assigned to the steps in which the same processing is performed as the processing of the image search device 100 in Embodiment 1 shown in FIG. 10.

The image search device 300 according to the present embodiment differs from the image search device 100 in Embodiment 1 in that the image search device 300 modifies the interpolation image based on the photographing condition of the image provided to the input unit 103. However, the other processing are the same as those in the image search device 100 in Embodiment 1. More specifically, in FIG. 23, the processing of Step S101 to S108 performed by the image search device 300 are the same as those performed in the image search device 100 in Embodiment 1 shown in FIG. 10; and thus, descriptions of them are not repeated.

The interpolation image modifying unit 301 modifies the interpolation image based on the photographing condition of the image content data 20 provided to the input unit 103 (Step S601).

Figure 24:
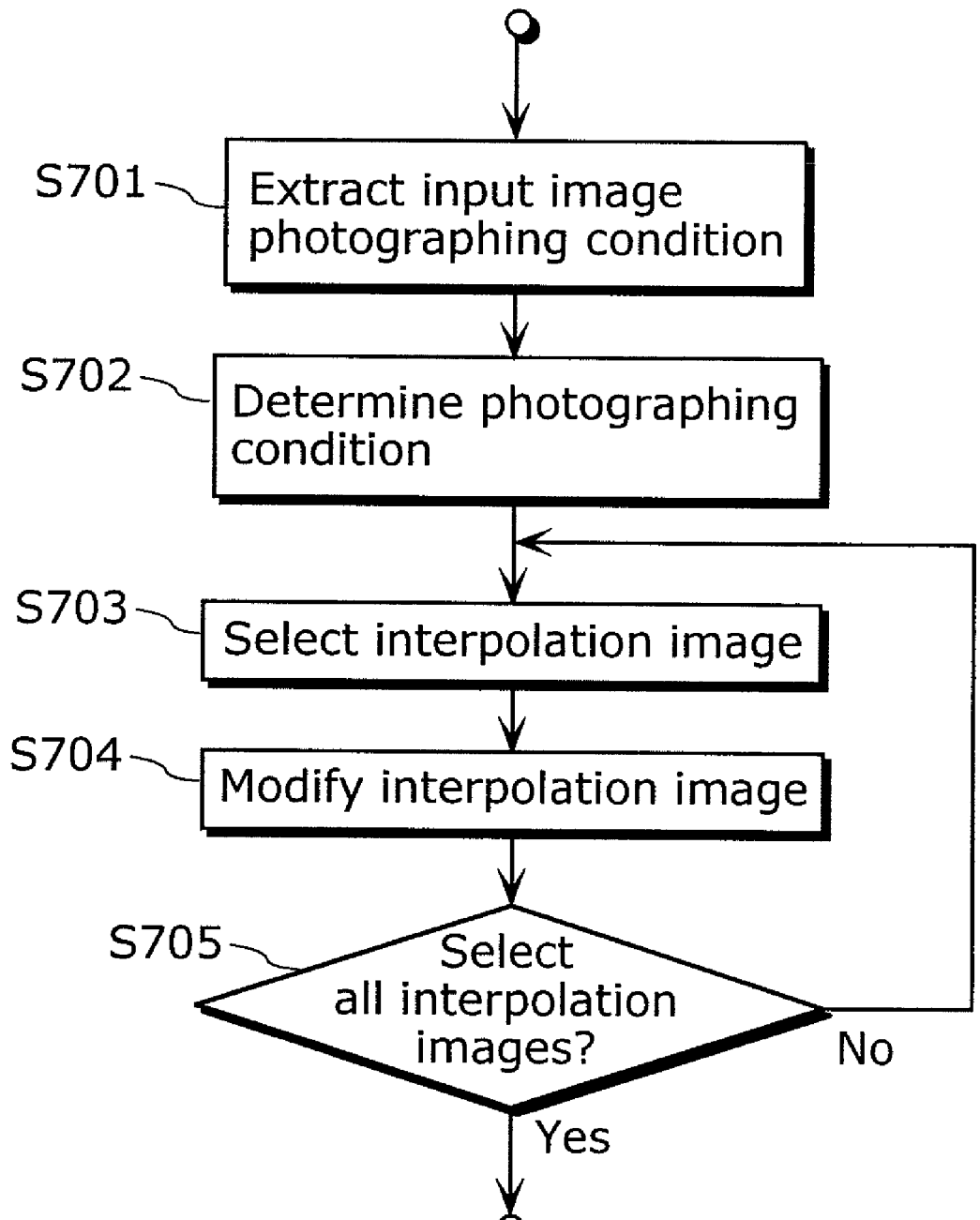
FIG. 24 is a flowchart showing flow of detailed processing of steps related to modification of an interpolation image shown in FIG. 23.

FIG. 24 is a flowchart showing the detailed processing of the step (Step S601) for modifying the interpolation image shown in FIG. 23. Hereinafter, detailed description is given of the processing performed by the interpolation image modifying unit 301 in Step S601, with reference to FIG. 24.

First, the interpolation image modifying unit 301 refers to the image database 101 to obtain the photographing condition which is included in the content associated information 21 and which corresponds to the image ID 23 provided to the input unit 103 (Step S701).

Next, the interpolation image modifying unit 301 computes the photographing condition that the user prefers, based on the photographing condition obtained in Step S701 (Step S702). To be more specific, the interpolation image modifying unit 301 computes the average value of each photographing condition.

Next, the interpolation image modifying unit 301 selects one interpolation image from among the interpolation images obtained by the interpolation image obtaining unit 108 (Step S703).

Figure 25:
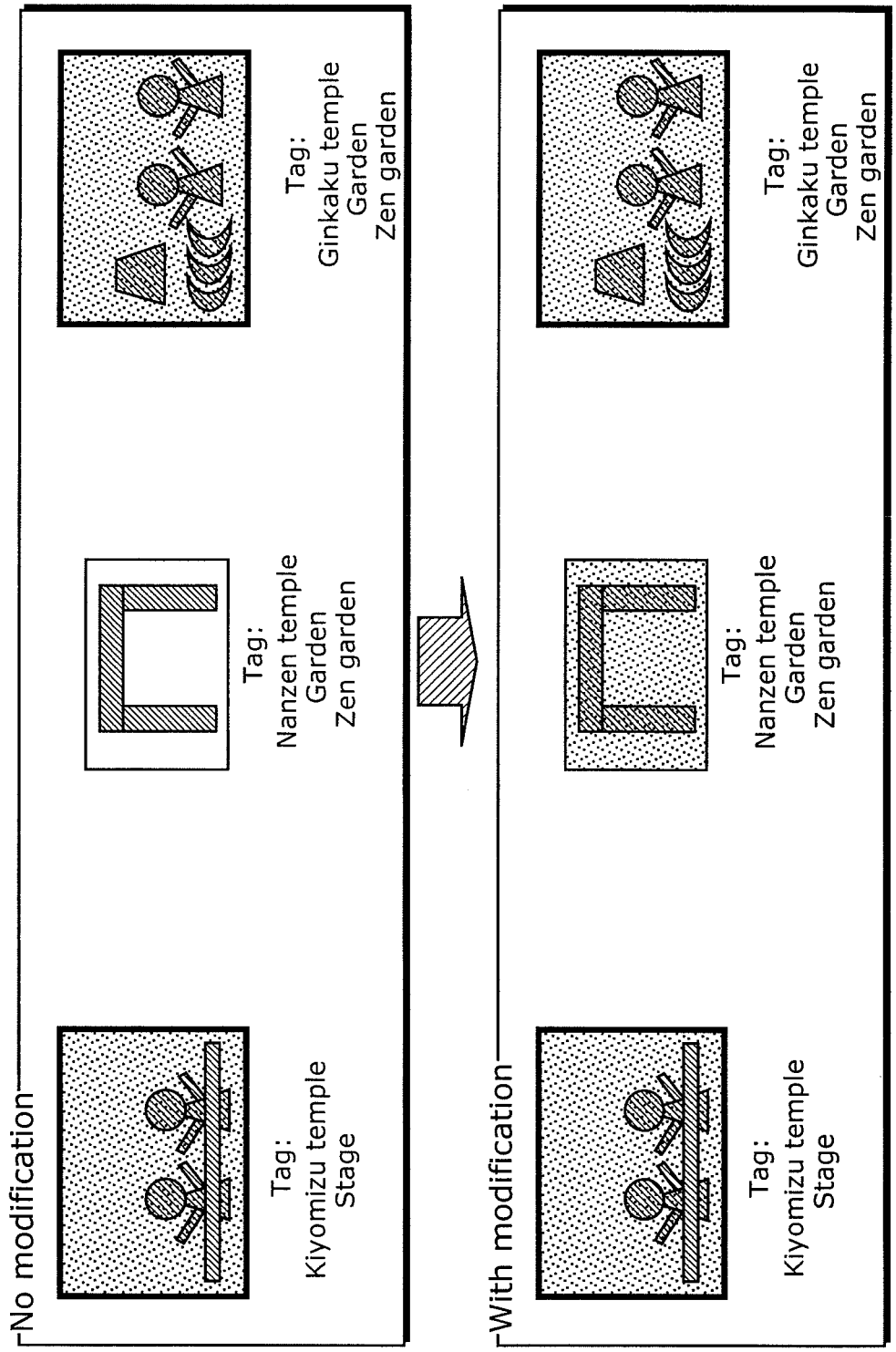
FIG. 25 is a comparison diagram of examples of outputs of interpolation images with and without an interpolation image modifying unit.

Next, the interpolation image modifying unit 301 modifies the interpolation image selected in Step S703 (Step S704). To be more specific, the interpolation image modifying unit 301 converts the pixel value of the interpolation image selected in Step S703 to the pixel value of the photographing condition computed in Step S702. For example, the interpolation image modifying unit 301 modifies the interpolation image such that the RGB value of the interpolation image is the average value of the RGB ratio of the image content data 20 provided to the input unit 103. Further, for example, the interpolation image modifying unit 301 modifies the interpolation image such that the resolution of the interpolation image is the average vale of the resolution of the image content data 20 provided to the input unit 103. As a result, as shown in FIG. 25, the image search device 300 can output the interpolation image which match the photographing condition of the photo taken by the user.

Next, the interpolation image modifying unit 301 determines whether or not all the interpolation images obtained by the interpolation image obtaining unit 108 have been selected (Step S705). Here, in the case where all the interpolation images have not been selected (No in Step S705), the interpolation image obtaining unit 108 repeats the processing of Step S703 and Step S704. On the other hand, in the case where all of the interpolation images have been selected (Yes in Step S705), the processing continues at Step S108.

As described, by performing the processing of Steps S701 to S705, the interpolation image modifying unit 301 modifies the interpolation image obtained by the interpolation image obtaining unit 108 in accordance with the photographing condition of the image taken by the user.

Accordingly, by performing the processing of Step S101 to S108 and Step S601, the image search device 300 can output, as the interpolation image, an image which looks like an image taken with the photographing condition similar to that of the interpolation target image. Thus, the user can create an album (image group) which has a unity as a whole.

Embodiment 4

Next, an image search device 400 according to Embodiment 4 of the present invention is described.

The image search device 400 according to the present embodiment is characterized in that images with different angle of view with respect to the same subject are obtained from among the interpolation images.

The image search devices 100 and 200 in Embodiment 1 and 2 obtains the interpolation images using the tags; and thus, a plurality of images with the same angle of view may be displayed.

The image search device 400 according to the present embodiment computes the angle of view of the subject from the content associated information 21 of the image content data 20 photographed by the user. The image search device 400 selects only the interpolation images with the angle of view different from the computed angle of view.

Hereinafter, with reference to FIG. 26, each element of the image search device 300 is described in order.

Figure 26:
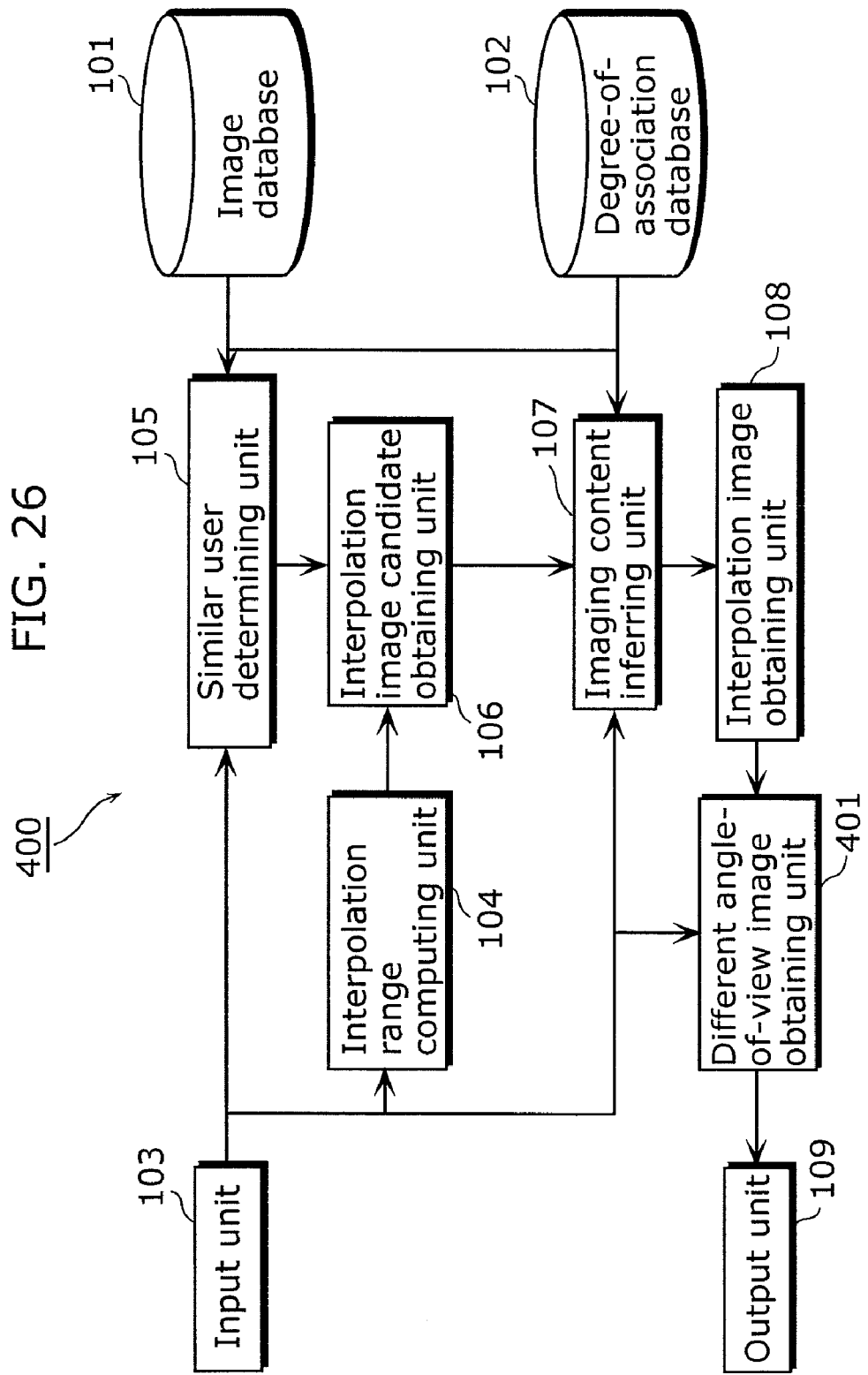
FIG. 26 is a block diagram showing a characteristic functional structure of an image search device according to Embodiment 4 of the present invention.

FIG. 26 is a block diagram showing characteristic functional structure of the image search device 400 according to Embodiment 4 of the present invention. In FIG. 26, the same referential numbers are assigned to elements having the same function as those of the image search device 100 shown in FIG. 1. The image search device 400 shown in FIG. 26 differs from the image search device 100 shown in FIG. 1 in that the image search device 400 includes a different angle-of-view image obtaining unit 401 which obtains interpolation images with different angle of view with respect to the same subject from among the interpolation images.

In the case where the interpolation images obtained by the interpolation image obtaining unit 108 includes multiple images of the same subject, the different angle-of-view image obtaining unit 401 obtains, from among the multiple images of the same subject, the interpolation images which are different at least in angle of view. Specific obtaining method of the interpolation images is described later.

Figure 27:
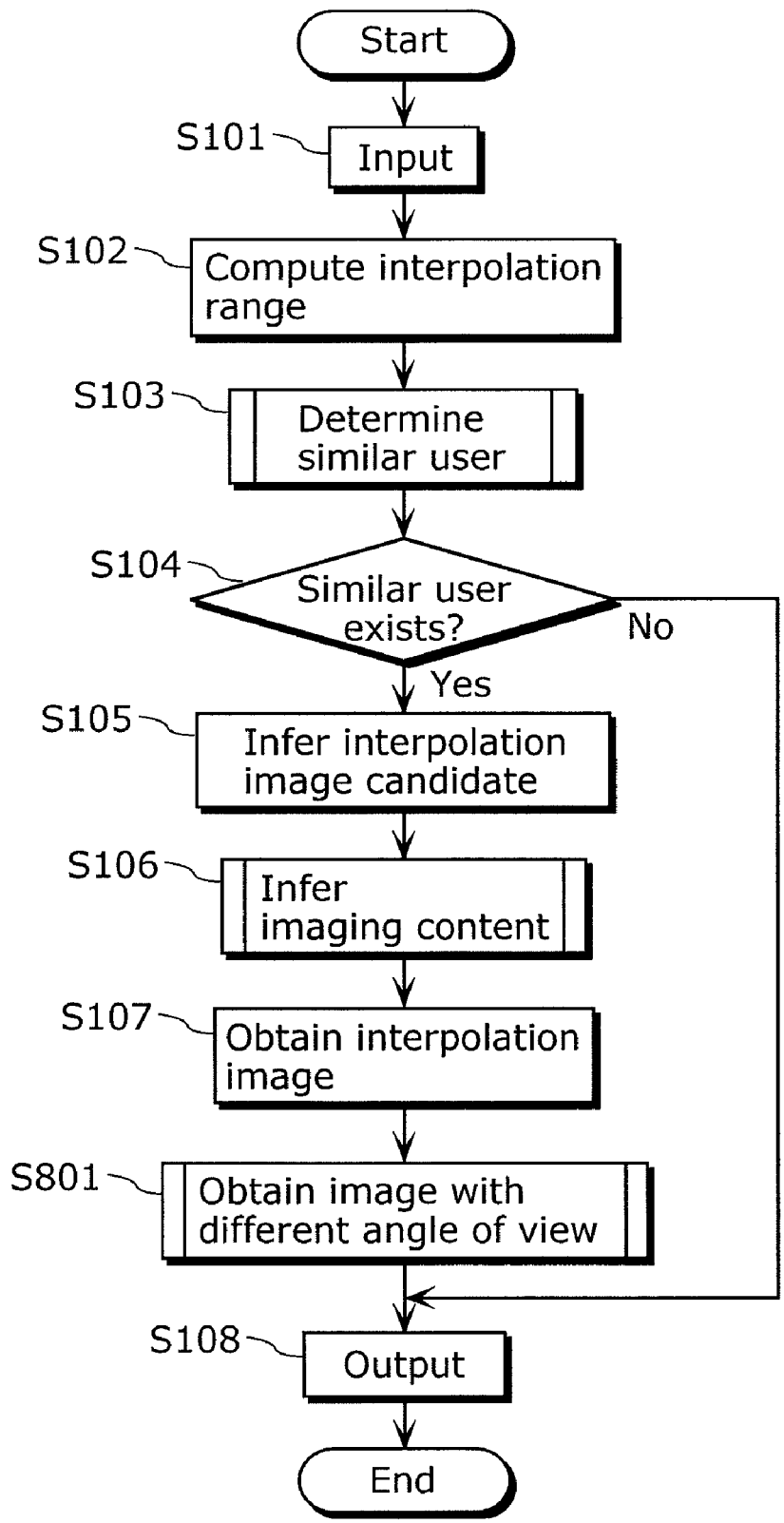
FIG. 27 is a flowchart showing flow of overall processing performed by the image search device according to Embodiment 4 of the present invention.

Next, with reference to the flowchart of FIG. 27, the flow of the overall processing performed in the image search device 400 shown in FIG. 26 is described.

FIG. 27 is a flowchart showing the flow of overall processing performed by the image search device 400. In FIG. 27, the same referential numbers are assigned to the steps in which the same processing is performed as the processing of the image search device 100 in Embodiment 1 shown in FIG. 10, and the descriptions of them are not repeated.

The image search device 400 according to the present embodiment differs from the image search device 100 according to Embodiment 1 in that the image search device 400 obtains the interpolation images with different angle of view for the same subject from among the interpolation images obtained by the interpolation image obtaining unit 108. However, the other processing are the same as those performed by the image search device 100 in Embodiment 1. More specifically, in FIG. 27, the processing of Steps S101 to S108 performed by the image search device 400 are the same as those performed by the image search device 100 in Embodiment 1 shown in FIG. 10; and thus, descriptions of them are not repeated.

In the case where the interpolation images obtained by the interpolation image obtaining unit 108 includes multiple images with the same subject, the different angle-of-view image obtaining unit 401 obtains the interpolation images which are different at least in angle of view from among the multiple images with the same subject (Step S801).

Figure 28:
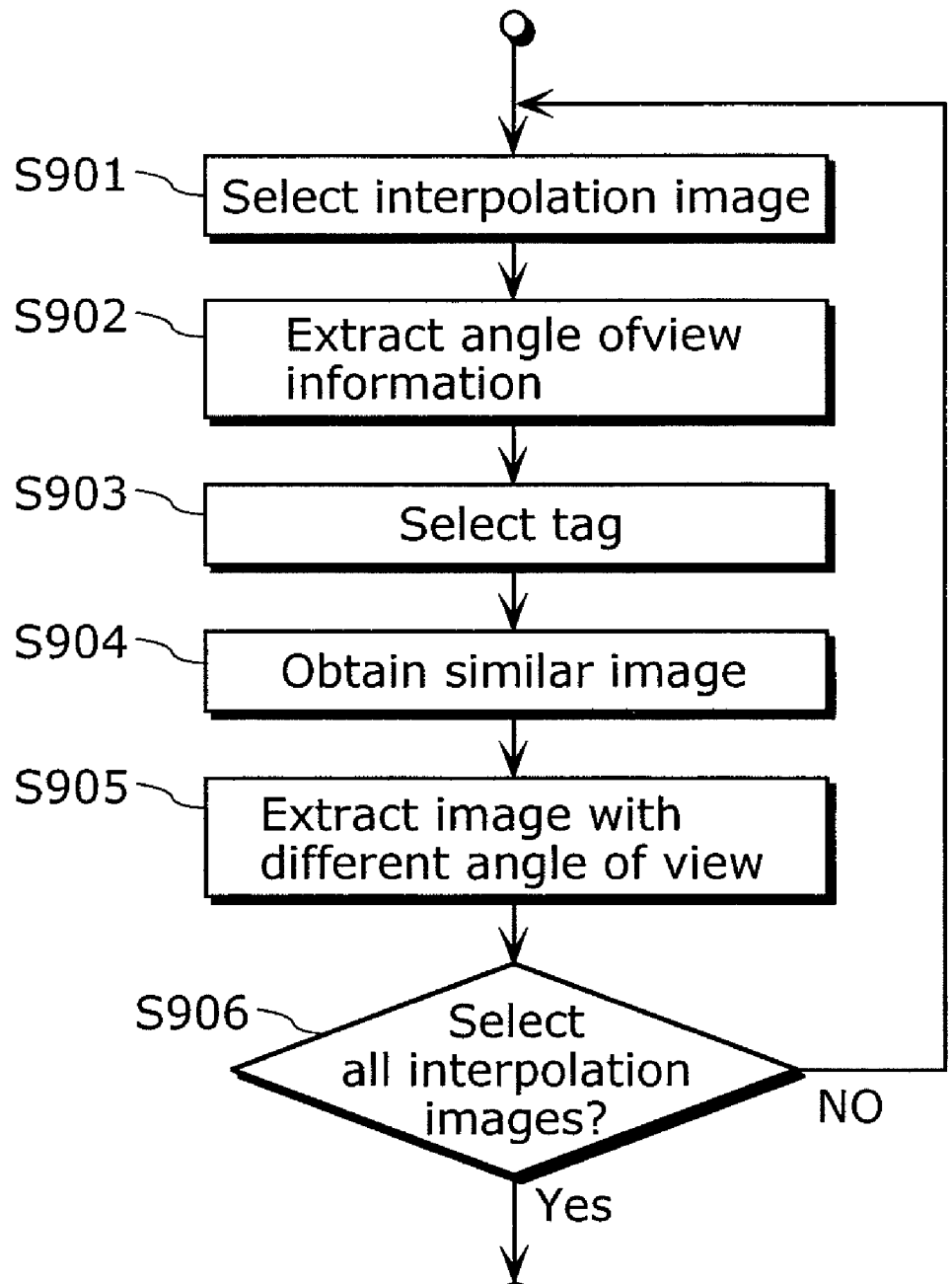
FIG. 28 is a flowchart showing flow of detailed processing of steps related to obtainment of different angle-of-view images shown in FIG. 27.

FIG. 28 is a flowchart showing the flow of detailed processing of the step (Step S801) for obtaining images with different angle of view shown in FIG. 27. Hereinafter, detailed description is given of the processing performed by the different angle-of-view image obtaining unit 401 in Step S801, with reference to FIG. 28.

First, the different angle-of-view image obtaining unit 401 selects one interpolation image from among the interpolation images obtained by the interpolation image obtaining unit 108 (Step S901). Hereinafter, the image selected in Step S901 is referred to as the selected image.

Next, the different angle-of-view image obtaining unit 401 extracts angle-of-view information of the selected image (Step S902). The angle-of-view information refers to the image parameter related to the angle of view of the image, such as the subject distance and the photographing location.

Next, the different angle-of-view image obtaining unit 401 obtains the tags 27 attached to the selected image (Step S903).

Next, the different angle-of-view obtaining unit 401 obtains, using the tags 27 obtained in Step S903, similar images which have similar tags from among the interpolation images obtained by the interpolation image obtaining unit 108. More specifically, for example, the different angle-of-view image obtaining unit 401 selects, as a similar image, the interpolation image which has the tag 27, among the tags 27 obtained in Step S903, which matches the tag 27 having lowest appearance frequency among the interpolation images. The similar image thus obtained and the selected image can be handled as the image with the same subject since they both have the same tag 27.

Next, the different angle-of-view image obtaining unit 401 selects, from among the similar images, the images with different angle of view (different angle-of-view images) (Step S905). The angle of view is computed using the photographing location 26 and the subject distance 28. As described earlier, the selected image and the similar image have the same subject. Thus, in the case where the photographing location 26 of the selected image and the similar image are different, the selected image and the similar image are the images with the same subject but different angle of view. Whether the photographing location 26 is different or not can be determined based on whether or not the distance between the photographing locations of the selected image and the similar image exceeds threshold. Here, the threshold may be predetermined by a designer. Further, similar to the case of the photographing location 26, when the subject distance 28 are different, the selected image and the similar image include the different angle of view. Whether or not the subject distance 28 are different may be determined based on whether or not the difference of the subject distance 28 of the selected image and the similar image exceeds threshold.

Next, the different angle-of-view image obtaining unit 401 determines whether or not all the interpolation images obtained by the interpolation image obtaining unit 108 have been selected (Step S906). Here, when not all the interpolation images have been selected (No in Step S906), the different angle-of-view image obtaining unit 401 repeats the processing of Steps S901 to S905. On the other hand, in the case where all of the interpolation images have been selected (Yes in Step S906), the processing continues at Step S108.

Figure 29:
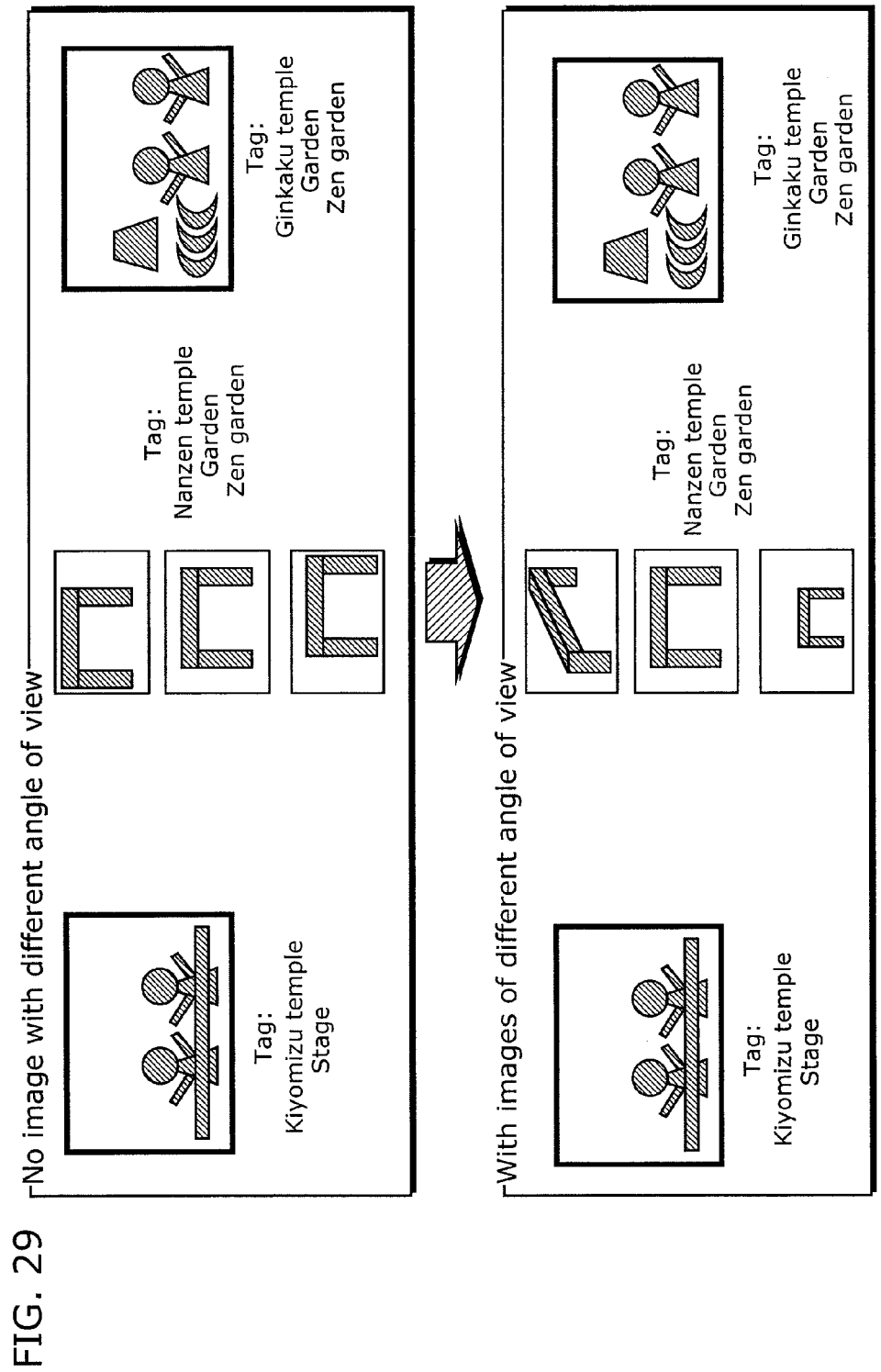
FIG. 29 is a comparison diagram showing examples of outputs of interpolation images with and without a different angle-of-view image obtaining unit.

As described, by performing the processing of Step S901 to S906, the different angle-of-view image obtaining unit 401 can obtain, from among the interpolation images obtained by the interpolation image obtaining unit 108, only the images with the different angle of view for the same subject as shown in FIG. 29.

Accordingly, by performing the processing of Steps S101 to S108, and Step S801, the image search device 400 can output the images with different angle of view for the same subject. Thus, the user can avoid adding similar images to the album.

The image search device according to the present invention has been described so far based on the embodiments; however, the present invention is not limited to those embodiments. Those skilled in the art will readily appreciate that many modifications in the exemplary embodiments and combinations of elements in different embodiments are possible without materially departing from the novel teachings and advantages of this invention. Accordingly, all such modifications are intended to be included within the scope of this invention.

It is to be noted that the present invention can be implemented as an image search method which executes characteristic elements of such an image search device and also as a program causing a computer to execute the method. Such a program can be distributed via a recording medium such as a compact disc-read only memory (CD-ROM) or a transmission medium such as the Internet.

Further, the search image devices 100, 200, 300, and 400 according to the above embodiments are typically implemented by a computer including, for example, central processing unit (CPU), read only memory (ROM), random access memory (RAM), and communication interface. In such a computer, the CPU executes programs for executing processing performed by the characteristic elements of the image search device, while using the RAM as a work area. This allows the computer to execute the processing performed by each element included in the image search device. Further, the program executed by the CPU may be any programs as long as they are read via a CD-ROM device or the communication interface or they are stored in the ROM.

The present invention described above is applicable to, for example, an image search device which can relatively easily output images that the user wish to use for interpolation from among a large volume of stored image content data.

For example, the present invention can be applied to a device which automatically creates a photo album by a user searching images that the user wishes to use for interpolation from a database including a large volume of image data on the Web or the like.

Further, the conventional methods require relatively large infrastructure cost since tag readers must be installed at every photo spots of tourist sites. For example, in case of the tourist cites having many photo spots, such as Kyoto or Okinawa, tag readers must be installed at respective photo spots, which is costly. Further, costs for maintenance of those tag readers are also necessary.

On the other hand, the present invention according to the embodiments above produces an advantageous effect that such a dedicated infrastructure is not necessary.

INDUSTRIAL APPLICABILITY

The present invention can be used as an image search device which outputs image content data for interpolation between the photographing locations of the image content data photographed by the user from among a large volume of stored image content data.

REFERENCE SIGNS LIST

20 Image content
21 Content associated information
22 User ID
23 Image ID
24 Image address
25 Photographing time and date
26 Photographing location
27 Tag
28 Subject distance
50 Large area
51 Middle area
52 Small area
60 Interpolation target image (Kiyomizu temple)
61 Interpolation target image (Ginkaku temple)
70, 71 Range information
72 Interpolation range
90 Interpolation image (Garden)
91 Interpolation image (Zen garden)
92 Interpolation image (Shirakawa)
100, 200, 300, 400 Image search device
101 Image database
102, 201 Association degree database
103 Input unit
104 Interpolation range computing unit
105 Similar user determining unit
106 Interpolation image candidate obtaining unit
107, 202 Image content inferring unit
108 Interpolation image obtaining unit
109 Output unit
130 Dashed line area
131 Interpolation target image
132 Interpolation target image tag
301 Interpolation image modifying unit
401 different angle-of-view image obtaining unit
1001 Photographed image

The invention claimed is:

1. An image search device which outputs an image searched for from among a plurality of images, said image search device comprising:
a degree-of-association database which stores a degree of association indicating a degree of association between images;
an input unit configured to receive a first image including first information and a second image including second information;
an interpolation range computing unit configured to compute, as an interpolation range, a range of an area including a first photographing location of the first image and a second photographing location of the second image, the first photographing location being obtained from the first information, the second photographing location being obtained from the second information;
an imaging content inferring unit configured to infer imaging content of an interpolation image to be used for an interpolation between the first photographing location and the second photographing location, based on (i) the degree of association between the first image and an image which is among the plurality of images and belongs to the interpolation range computed by said interpolation range computing unit, and (ii) the degree of association between the second image and the image which is among the plurality of images and belongs to the interpolation range computed by said interpolation range computing unit, the degrees of association being stored in the degree-of-association database;
an interpolation image obtaining unit configured to obtain the interpolation image from among the plurality of images, using the imaging content inferred by said imaging content inferring unit; and
an output unit configured to output the interpolation image obtained by said interpolation image obtaining unit.

2. The image search device according to claim 1, further comprising:
a similar image group detecting unit configured to detect, from among the plurality of images, a similar image group including an image similar to the first image and an image similar to the second image; and
an interpolation image candidate obtaining unit configured to obtain, from the similar image group detected by said similar image group detecting unit, a candidate image which is an image whose photographing location belongs to the interpolation range computed by said interpolation range computing unit,
wherein said imaging content inferring unit is configured to infer the imaging content of the interpolation image based on (i) the degree of association between the first image and the candidate image obtained by said interpolation image candidate obtaining unit, and (ii) the degree of association between the second image and the candidate image obtained by said interpolation image candidate obtaining unit, and said interpolation image obtaining unit is configured to obtain the interpolation image from among candidate images including the candidate image that are obtained by said interpolation image candidate obtaining unit.

3. The image search device according to claim 2, wherein the degree of association stored in said degree-of-association database is a degree of association between subject information each representing a word related to a subject, the imaging content of the interpolation image inferred by said imaging content inferring unit is subject information of the candidate image having a degree of association equal to or greater than a predetermined degree of association, the degree of association being between the subject information obtained from the candidate image and the subject information obtained from each of the first information and the second information, the degree of association being stored in said degree-of-association database, and said interpolation image obtaining unit is configured to obtain, as the interpolation image, the candidate image having imaging content which matches the imaging content inferred by said imaging content inferring unit.

4. The image search device according to claim 2, wherein said similar image group detecting unit is configured to detect, as the similar image group, an image group including (i) an image taken at a photographing location within a predetermine distance from the first photographing location and at time within a predetermined time period from the photographing time of the first image obtained from the first information and (ii) an image taken at a photographing location within a predetermined distance from the second photographing location and at time within a predetermined time period from the photographing time of the second image obtained from the second information.

5. The image search device according to claim 2, wherein said similar image group detecting unit is configured to detect, as the similar image group, an image group including an image which was taken (i) at a photographing time at which a sum of (a) a difference value between the photographing time of the image and the photographing time of the first image and (b) a difference value between the photographing time of the image and the photographing time of the second image is equal to or less than a predetermined value, the photographing time of the first image being obtained from the first information, the photographing time of the second image being obtained from the second information, and (ii) at a photographing location within a predetermined distance from the first photographing location and the second photographing location.

6. The image search device according to claim 2, wherein said similar image group detecting unit is configured to detect, as the similar image group, an image group including (i) an image which was taken at a photographing location within a predetermined distance from the first photographing location and which was taken in a year within a predetermined number of years from a year when the first image was taken, the year when the first image was taken being obtained from the first information, and (ii) an image which was taken at a photographing location within a predetermined distance from the second photographing location and which was taken in a year within a predetermined number of years from a year when the second image was taken, the year when the second image was taken being obtained from the second information.

7. The image search device according to claim 2, wherein said similar image group detecting unit is configured to detect, as the similar image group, an image group including (i) an image which was taken at a photographing location within a predetermined distance from the first photographing location and which was taken in a month within a predetermined number of months from a month when the first image was taken, the month when the first image was taken being obtained from the first information and (ii) an image which was taken at the photographing location within a predetermined distance from the second photographing location and which was taken in a month within a predetermined number of months from a month when the second image was taken, the month when the second image was taken being obtained from the second information.

8. The image search device according to claim 2, wherein said degree-of-association database stores the degree of association per an area indicating a predetermined area, and said imaging content inferring unit is configured to infer the imaging content of the interpolation image based on (i) the degree of association which is between the candidate image and the first image and which corresponds to the area including the first photographing location and (ii) the degree of association which is between the candidate image and the second image and which corresponds to the area including the second photographing location.

9. The image search device according to claim 2, wherein said degree-of-association database stores a degree of association between activity information, photographing time, and photographing location, the activity information being a word representing an activity of a photographer when an image was taken, said imaging content inferring unit is configured to infer the activity information as the imaging content in the case where a value indicating a degree of association of each activity information of the image belonging to the interpolation range is equal to or greater than a predetermined threshold, the value being computed based on (i) the degree of association which is stored in said degree-of-association database and which corresponds to the activity information, the photographing time, and the photographing location of the first image that are obtained from the first information, and (ii) the degree of association which is stored in said degree-of-association database and which corresponds to the activity information, the photographing time, and the photographing location of the second information, and said interpolation image obtaining unit is configured to obtain, as the interpolation image, the candidate image having imaging content which matches the imaging content inferred by said imaging content inferring unit.

10. The image search device according to claim 1, wherein the interpolation range computed by said interpolation range computing unit includes a larger area as a difference increases between photographing time and date of the first image obtained from the first information and photographing time and date of the second image obtained from the second information.

11. The image search device according to claim 1, further comprising
an interpolation image modifying unit configured to modify the interpolation image obtained by said interpolation image obtaining unit, based on a photographing condition of the first image obtained from the first information and a photographing condition of the second image obtained from the second information,
wherein said output unit is configured to output the interpolation image modified by said interpolation image modifying unit.

12. The image search device according to claim 1, further comprising
a different angle-of-view image obtaining unit configured to obtain, as interpolation images, images that are different in at least angle of view of the same subject from among the plurality of images with the same subject, in the case where a plurality of images with a same subject are included in the interpolation images including the interpolation image, the interpolation images including the interpolation image being obtained by said interpolation image obtaining unit,
wherein said output unit is configured to output the interpolation images obtained by said different angle-of-view image obtaining unit.

13. An image search method performed by a computer to output an image searched for from among a plurality of images, said image search method comprising:
receiving a first image including first information and a second image including second information;
computing, as an interpolation range, a range of an area including a first photographing location of the first image obtained from the first information and a second photographing location of the second image obtained from the second information;
inferring imaging content of an interpolation image to be used for an interpolation between the first photographing location and the second photographing location, based on (i) a degree of association between the first image and an image which is among the plurality of images and belongs to the interpolation range computed by said computing, and (ii) a degree of association between the second image and the image which is among the plurality of images and belongs to the interpolation range computed by said computing, the degrees of association indicating a degree of association between images and being stored in a degree-of-association database;
obtaining the interpolation image from among the plurality of images using the imaging content inferred by said inferring; and
outputting the interpolation image obtained by said obtaining.

14. A non-transitory computer readable recording medium storing a program for outputting an image searched for from among a plurality of images, said program causing a computer to execute:
receiving a first image including first information and a second image including second information;
computing, as an interpolation range, a range of an area including a first photographing location of the first image obtained from the first information and a second photographing location of the second image obtained from the second information;
inferring imaging content of an interpolation image to be used for an interpolation between the first photographing location and the second photographing location, based on (i) a degree of association between the first image and an image which is among the plurality of images and belongs to the interpolation range computed by said computing, and (ii) a degree of association between the second image and the image which is among the plurality of images and belongs to the interpolation range computed by said computing, the degrees of association indicating a degree of association between images and being stored in a degree-of-association database;
obtaining the interpolation image from among the plurality of images using the imaging content inferred by said inferring; and
outputting the interpolation image obtained by said obtaining.

15. An image inferring device which infers an image to be searched for from among a plurality of images, said image inferring device comprising:
a degree-of-association database which stores a degree of association each indicating a degree of association between images;
an interpolation range computing unit configured to compute, as an interpolation range, a range of an area including a first photographing location of a first image and a second photographing location of a second image; and
an imaging content inferring unit configured to infer imaging content of an interpolation image to be used for an interpolation between the first photographing location and the second photographing location, based on (i) the degree of association between the first image and an image which is among the plurality of images and belongs to the interpolation range computed by said interpolation range computing unit and (ii) the degree of association between the second photographing location and the image which is among the plurality of images and belongs to the interpolation range computed by said interpolation range computing unit, the degrees of association being stored in the degree-of-association database.

* * * * *